US011142867B2

(12) United States Patent
Curran et al.

(10) Patent No.: US 11,142,867 B2
(45) Date of Patent: *Oct. 12, 2021

(54) SOIL-RESISTANT, STAIN-RESISTANT FLUORINE-FREE COATINGS AND METHODS OF APPLYING ON MATERIALS

(71) Applicant: University of Houston System, Houston, TX (US)

(72) Inventors: Seamus Curran, Houston, TX (US); Kang-Shyang Liao, Houston, TX (US); Nigel Alley, Houston, TX (US); Amrita Haldar, Houston, TX (US); Alexander Wang, Houston, TX (US)

(73) Assignee: UNIVERSITY OF HOUSTON SYSTEM, Houston, TX (US)

( * ) Notice: Subject to any disclaimer, the term of this patent is extended or adjusted under 35 U.S.C. 154(b) by 599 days.

This patent is subject to a terminal disclaimer.

(21) Appl. No.: 15/526,497

(22) PCT Filed: Nov. 12, 2015

(86) PCT No.: PCT/US2015/060328
§ 371 (c)(1),
(2) Date: May 12, 2017

(87) PCT Pub. No.: WO2016/077550
PCT Pub. Date: May 19, 2016

(65) Prior Publication Data
US 2017/0314189 A1    Nov. 2, 2017

Related U.S. Application Data

(60) Provisional application No. 62/078,564, filed on Nov. 12, 2014.

(51) Int. Cl.
| | |
|---|---|
| *D06M 13/513* | (2006.01) |
| *D06M 13/507* | (2006.01) |
| *D06M 15/643* | (2006.01) |
| *D06M 23/10* | (2006.01) |
| *C09D 5/00* | (2006.01) |
| *D06M 13/503* | (2006.01) |

(52) U.S. Cl.
CPC ............. *D06M 13/513* (2013.01); *C09D 5/00* (2013.01); *D06M 13/503* (2013.01); *D06M 13/507* (2013.01); *D06M 15/643* (2013.01); *D06M 23/10* (2013.01); *D06M 2200/01* (2013.01); *D06M 2200/12* (2013.01)

(58) Field of Classification Search
CPC ............. D06M 13/513; D06M 13/507; D06M 15/643; D06M 2200/01; D06M 2200/12
See application file for complete search history.

(56) References Cited

U.S. PATENT DOCUMENTS

| | | | |
|---|---|---|---|
| 5,190,804 A | 3/1993 | Seto et al. | |
| 5,492,992 A * | 2/1996 | Gilson ................... | B01J 10/002 528/14 |
| 5,852,095 A | 12/1998 | Yamauchi et al. | |
| 5,902,847 A * | 5/1999 | Yanagi ................. | C09D 201/00 524/269 |
| 6,083,602 A | 7/2000 | Caldwell et al. | |
| 7,879,743 B2 | 2/2011 | Bringley et al. | |
| 2001/0005530 A1 | 6/2001 | Clark et al. | |
| 2004/0110012 A1* | 6/2004 | Bier ....................... | B05D 7/544 428/422.8 |
| 2006/0172641 A1 | 8/2006 | Hennige et al. | |
| 2006/0205907 A1 | 9/2006 | Guyer | |
| 2007/0265409 A1* | 11/2007 | Wakabayashi ........... | C08K 5/16 528/28 |
| 2008/0090010 A1* | 4/2008 | Zhang .................... | B82Y 30/00 427/372.2 |
| 2008/0148491 A1 | 6/2008 | van Buskirk et al. | |

(Continued)

FOREIGN PATENT DOCUMENTS

| | | |
|---|---|---|
| CN | 101100395 A | 1/2008 |
| CN | 102725359 A1 | 10/2012 |

(Continued)

OTHER PUBLICATIONS

Daoud et al ("Superhydrophobic Silica Nanocomposite Coating by a Low-Temperature Process" J. Am. Ceram. Soc. 87[9] 1782-1784 (2004). (Year: 2004).*
Nakajima et al., "Preparation of hard super-hydrophobic films with visible light transmission", 2000, Thin Solid Films, 376, p. 140-143 (2000).
Webcapture of www.ausetute.com.au.reactrate.html from Internet archive Wayback Machine as available on Sep. 9, 2009 (2009).
Shillingford, Cicely et al.; Fabrics coated with lubricated nanostructures display robust omniphobicity; Nanotechnology, Dec. 11, 2013, vol. 25, No. 1, Article No. 014019.

(Continued)

*Primary Examiner* — Nathan H Empie
(74) *Attorney, Agent, or Firm* — Winstead PC

(57) ABSTRACT

A process of fabricating the waterproof coating may include selecting a textile material substrate, utilizing a sol-gel comprising a silane or silane derivative and metal oxide precursor to coat the substrate, and optionally coating the substrate with a hydrophobic chemical agent and/or other chemical agents to create a surface with nanoscopic or microscopic features. The process may utilize an all solution process or controlled environment for fabricating a fluorine-free waterproof coating that prevent wetting or staining of a substrate, or may utilize a controlled environment. The composition coatings for treating textile materials improve soil-resistance and stain-resistance of the textile materials while the compositions contain no fluorine-based chemicals. In addition, the composite solution may impart additional properties such as physical strength to the textile whilst retaining the original appearance.

16 Claims, No Drawings

(56) References Cited

U.S. PATENT DOCUMENTS

| | | |
|---|---|---|
| 2009/0206296 A1 | 8/2009 | Dave |
| 2010/0330380 A1 | 12/2010 | Colreavy et al. |
| 2011/0308423 A1 | 12/2011 | Friedel et al. |
| 2012/0040577 A1* | 2/2012 | Kissel ............... C09D 7/62 442/81 |
| 2012/0196134 A1 | 8/2012 | Weinelt et al. |
| 2012/0283350 A1 | 11/2012 | Saito et al. |
| 2012/0296029 A1* | 11/2012 | Liu ............... C08F 293/005 524/520 |
| 2012/0328875 A1 | 12/2012 | Schoneveld et al. |
| 2013/0337226 A1 | 12/2013 | Curran et al. |
| 2014/0342098 A1 | 11/2014 | Curran et al. |
| 2015/0064340 A1 | 3/2015 | Curran et al. |
| 2017/0313888 A1 | 11/2017 | Curran et al. |
| 2017/0335508 A1 | 11/2017 | Curran et al. |
| 2018/0016400 A1 | 1/2018 | Gutacker et al. |

FOREIGN PATENT DOCUMENTS

| | | |
|---|---|---|
| JP | H02-036282 | 2/1990 |
| JP | H08-062404 | 3/1996 |
| JP | 09-157277 A | 6/1997 |
| JP | 2000-186250 | 7/2000 |
| JP | 2004-035313 | 2/2004 |
| JP | 2004-238418 | 8/2004 |
| JP | 2006-198466 | 8/2006 |
| JP | 2006-249182 | 9/2006 |
| JP | 2009-297626 | 12/2009 |
| JP | 2010-254734 | 11/2010 |
| JP | 2010-260830 | 11/2010 |
| KR | 10-1382370 B1 | 4/2014 |
| RU | 2394956 C1 | 7/2010 |
| WO | 2006132852 A1 | 12/2006 |
| WO | 2009029979 A1 | 3/2009 |
| WO | 2009144495 A2 | 12/2009 |
| WO | 2010000476 A1 | 1/2010 |
| WO | 2011-077211 | 6/2011 |
| WO | 2015082409 A2 | 6/2015 |

OTHER PUBLICATIONS

Wang, Shing Dar et al.; Application of superhydrophobic sol gel on canvas; Applied Surface Science, Apr. 4, 2014 (online published), vol. 307, pp. 101-108.

De Francisco, Raquel et al.; Multipurpose ultra and superhydrophobic surfaces based on oligodimethylsiloxane-modified nanosilica; ACS Applied Materials and Interfaces, Oct. 2, 2014, vol. 6, No. 21, pp. 18998-19010.

* cited by examiner

SOIL-RESISTANT, STAIN-RESISTANT FLUORINE-FREE COATINGS AND METHODS OF APPLYING ON MATERIALS

RELATED APPLICATIONS

This application claims the benefit of U.S. Provisional Patent Applications No. 62/078,564 filed on Nov. 12, 2014, which is incorporated herein by reference.

FIELD OF THE INVENTION

The present invention relates to fluorine-free composition coatings and to treating textile fibers, or other flexible materials with such coatings for improving soil-resistance, stain-resistance and ease of removing particulates. The invention also relates to treating textile materials with such coatings to impart water repellency, oil repellency, stain reduction and/or stain removal.

BACKGROUND OF THE INVENTION

Stain- and soil-resistant/repellency properties are highly desirable. This is especially the case for textile articles, such as carpet, rugs, car mats, fabrics and upholstery. Approximately 75% of all carpet currently produced in the United States and approximately 50% of all carpet produced in Europe, is made from nylon fiber. Nylon, as well as other polyamide fibers and fabrics, is easily stained or soiled by natural and artificial dyes and pigments such as those found in coffee, mustard, wine and soft drinks. In general, the enhanced hydrophobicity and related stain-, soil- and water-resistant properties of a surface are imparted due to the presence of fluorine atoms. This typically is exemplified when a material's C—H bonds are substituted or replaced by C—F bonds. The development and design of coatings for textiles is transitioning away from the incorporation and use of chemical compositions containing Fluorine atoms due to the associated environmental and health risks. These risks are twofold: first, there are risk associated with the synthetic processes involved in making suitable fluorochemicals where the chemicals used and byproducts of these processes are not considered safe or 'green,' and second, the degradation and leaching of such chemicals (including, but not limited to, man-made Perfluorooctanoic acid [PFOA], their homologues, precursors and salts—Perfluorooctane sulfonic acid [PFOS]) on finished products, which may allow the chemicals to find their way into the general population through subsequent bioaccumulation pathways (pollution of water supplies, entering the food chain, etc.).

As detailed in EPA-SAB-06-006 (Draft Risk Assessment of Potential Human Health Effects Associated with PFOA and Its Salts), a US Scientific Advisory Board panel judged that PFOA were likely to be carcinogenic. In late 2013, the United States Environmental Protection Agency (EPA) issued a Significant New Use Rule (SNUR) under the Toxic Substances Control Act (TSCA) requiring anyone who intends to manufacture (including import) or process any long-chain perfluoroalkyl carboxylic (LCPFAC) chemicals for use in carpets or carpet pieces to provide a notification to EPA. This rule can affect a wide range of industries and there is a continuing effort being made to find replacement materials. Therefore, to develop replacement for the existing fluorine-based stain- and soil-resistant treatments becomes highly desirable for both the environmental and economic aspects. There has been a trend of using shorter chain length materials containing Fluorine atoms such as Perfluorobutanoic acid (PFBA) or similar chemistries, but these alternatives are not always effective or worthwhile. In light of this, it would be advantageous to develop fluorine-free alternatives.

In prior work entitled "Waterproof Coating with Nanoscopic/Microscopic Features and Methods of Making Same" (U.S. Non-Provisional patent application Ser. No. 14/277,325), a solution process for fabricating self-cleaning and waterproof coating that prevent wetting or staining of a substrate is utilized. The resulting surface prevents the water "wetting" the substrate (thus it becomes "waterproof") and protects the substrate from the consequence (e.g. stain from dyes/pigments or water damage) caused by the wetting. Beyond hydrophobicity is the ability to use such hydrophobic coating in combination with other functional additives to enable selective rejection of soil and stains from dyes/pigments. In the systems and methods discussed herein, improved chemical composite coatings containing no fluorine-based chemicals and treating textile materials with such coatings for improving soil-resistance, stain-resistance, ease of removing particulates and/or methods suitable for industrial applications are disclosed herein.

SUMMARY OF THE INVENTION

In one embodiment, a process for fabricating a composite coating exhibiting soil-resistant and stain-resistant properties on textile or flexible articles may include selecting a textile or flexible substrate, and utilizing a sol-gel comprising at least a silane, silanol, metal oxide precursor, or a derivative thereof, to coat, bind, bond to the substrate. In some embodiments, the process may include optionally coating the substrate with a hydrophobic chemical agent and/or other chemical agents to create a surface with nanoscopic or microscopic features. In some embodiments, the above noted coatings may be deposited in a controlled environment by misting or vapor treatment mechanism. In other embodiments, the above noted coating may be deposited utilizing an all solution process.

In some embodiments, the composite coating may be provided in a composite solution to aid application, coating, deposition or the like onto a desired surface. In some embodiments, the composite solution for treating the surface of materials may include solvent(s) to disperse all the components to form a homogeneous solution. In some embodiments, the composite may use a partial hydrophilic or hydrophobic solvent to enable delivery of the composite to the substrate, which may be in itself more susceptible to water-based solvents. In some embodiments, the composite solution may include base chemical reagent(s) to form the body of the base composite. In some embodiments, the composite solution for treating the surface of materials may include chelating agent(s) to enhance homogeneity of the organic/inorganic material(s) in the solution. In some embodiments, the composite solution may include bonding agent(s) to aid bonding of the composite to a desired surface. In some embodiments, the composite solution may include plasticizer(s) to maintain elasticity of the base composite. In some embodiments, the composite solution may include viscosity modifier(s) to achieve a desired viscosity for the solution. In some embodiments, a surface treated with hydrophobic chemical agent(s) may be used to increase the surface hydrophobicity of the resulting composite.

In some embodiments, one or more functional organic/inorganic material additives may be added into the composite solution, while the additive's function does not impair or only has a limited effect on the original functions of the materials. Here the functional additives may have, but are not limited to, the properties of UV absorbing/blocking, anti-reflective, anti-abrasion, fire-retardant, conducting, anti-microbial, anti-bacterial, anti-fungal properties or pigmentation, or a combination thereof.

In some embodiments, one or more pigments, which do not impair or only have a slight effect the original functions of the composite coatings, may be added into the composite solution for textile material coating. Such pigments may include materials that change the color of reflected or transmitted light as the result of wavelength-selective absorption. Nonlimiting examples include the range of wavelengths humans can or cannot perceive, such as visible light having wavelength from approximately 390 to 700 nm; ultraviolet light having wavelengths approximately 100 to 390 nm and infrared and lower energy radiation having wavelength from approximately 700 nm to 1 mm. In some embodiments, pigments may also include materials that protect the host composite from degradation caused by exposure to ultraviolet radiation. In some embodiments, pigments may also include materials that emit colors, such as through fluorescence, phosphorescence, and/or other forms of luminescence.

The foregoing has outlined rather broadly various features of the present disclosure in order that the detailed description that follows may be better understood. Additional features and advantages of the disclosure will be described hereinafter.

DETAILED DESCRIPTION OF THE INVENTION

It is to be understood that both the foregoing general description and the following detailed description are exemplary and explanatory only, and are not restrictive of the invention, as claimed. While most of the terms used herein will be recognizable to those of ordinary skill in the art, it should be understood that when not explicitly defined, terms should be interpreted as adopting a meaning presently accepted by those of ordinary skill in the art. In this application, the use of the singular includes the plural, the word "a" or "an" means "at least one", and the use of "or" means "and/or", unless specifically stated otherwise. Furthermore, the use of the term "including", as well as other forms, such as "includes" and "included", is not limiting. Also, terms such as "element" or "component" encompass both elements or components comprising one unit and elements or components that comprise more than one unit unless specifically stated otherwise. Any ranges discussed herein are to be understood to include the end values defining the range, unless it is expressly stated that such end values are excluded. For example, terms such as "between X-Y", "equal to or between" X to Y or "from approximately" X to Y, where X has a lower value than Y, shall be understood to indicate that X≤range≤Y.

Terms and Definitions

The term "flexible" refers to materials that can deform elastically and return to its original shape when the applied stress is removed. Nonlimiting examples may include textiles, fabrics, carpet, or the like. While various embodiments discussed herein may specifically discuss textiles materials, it shall be understood that such embodiments are applicable to any flexible materials.

The term "textile" refers to any filament, fiber, or yarn that can be made into a fabric or cloth, and the term also includes the resulting fabric or cloth material itself. Textiles may include, but are not limited to, the following materials: natural fibers (protein or cellulosic) such as cotton, linen, wool, silk, leather synthetic fibers such as viscose, acrylic, nylon and polyester, semisynthetic fibers, synthetic leather, mineral-based fibers such as fiberglass, and any conceivable combinations of these materials or related microfibers. For the scope of this invention, "textile" shall also include, but not be limited to, any material, composite or product containing or partially composed of these aforementioned fibrous structural materials.

The term "soil resistant" refers to the ability of a textile to resist soiling from soiling agents that have come into contact with the textile. In some embodiments, soil resistant materials may not wholly prevent soiling, but the soil resistant materials may hinder soiling.

The term "soil-release" refers to the ability of a textile to be easily washed or otherwise treated to remove soil and/or oily materials that have come into contact with the textile. In some embodiments, soil-release materials may not wholly prevent the attachment of soil or oil materials to the textile, but the soil-release materials may hinder such attachment, improve ease of removal of particulates and/or improve the cleanability of the textile.

The term "stain resistant" refers to the ability of a textile to resist staining from staining agents that have come into contact with the textile. In some embodiments, stain resistant materials may not wholly prevent staining, but the stain resistant materials may hinder staining.

The term "hydrophobic" refers to a property of a material where the material impedes the wetting and/or absorption of water or water based liquids. In general, a material lacking affinity to water may be described as displaying "hydrophobicity."

The term "hydrophilic" refers to a property of a material where the material does not impede wetting and/or absorption of water or water based liquids. In general, a material with a strong affinity to water may be described as displaying "hydrophilicity".

The term "oleophobic" refers to a property of a material where the material impedes wetting and/or absorption of oil or oil based liquids.

The term "oleophilic" refers to a property of a material where the material does not impede wetting and/or absorption of oil or oil based liquids.

The term "wicking" refers to a property of a material where the material draws off water or water based liquids and/or oil or oil based liquids by capillary action. It shall be understood that in some embodiments hydrophobic and oleophobic materials discussed herein may prevent wicking.

The uses of organic/inorganic composite coatings to improve soil-resistant and stain-resistant of textile materials are discussed herein. The various embodiments of organic/inorganic materials and/or methods for manufacturing discussed herein offer new compositions and methods for making fluorine-free coatings from organic/inorganic materials for improved soil-resistance and stain-resistance, and/or other desired properties.

More specifically, embodiments of the present invention relate to compositions and methods for making organic/inorganic composite coating for textile or flexible materials, which comprise the following steps: Step 1) selecting a textile or flexible substrate, Step 2) utilizing a sol-gel comprising at least a silane, silanol, metal oxide precursor, or a derivative thereof to coat the substrate, and Step 3) optionally coating the substrate with a hydrophobic chemical agent and/or other chemical agents to create a surface with nanoscopic or microscopic features. In some embodiments, the above noted coatings may be deposited in a controlled environment by misting or vapor treatment. In other embodiments, the above noted coating may be deposited utilizing an all solution process.

In some embodiments, the composite coating may be provided as a composite solution to aid application, coating, deposition or the like onto a desired surface. In some embodiments, the composite solution for treating the surface of materials may include solvent(s), whether through a 'wet process,' misting mechanism or even vapor treatment method to disperse all the components to form a homogeneous entity. In some embodiments, the composite may use a partial hydrophilic or hydrophobic solvent to enable delivery of the composite to the substrate which may be in itself more susceptible to water-based solvents. In some embodiments, the composite solution may include base chemical reagent(s) to form the body of the base composite. In some embodiments, the composite solution for treating the surface of materials may include chelating agent(s) to enhance homogeneity of the organic/inorganic material(s) in the solution. In some embodiments, the composite solution may include bonding agent(s) to aid bonding of the composite to a desired surface. In some embodiments, the composite solution may include plasticizer(s) to maintain elasticity of the base composite. In some embodiments, the composite solution may include viscosity modifier(s) to achieve a desired viscosity for the solution. In some embodiments, a surface treated with hydrophobic chemical agent(s) may be used to increase the surface hydrophobicity of the resulting composite.

In some embodiments, the solvent(s) used to disperse all the components to form a homogeneous solution may include, but is not limited to, water, methanol, ethanol, n-propanol, isopropanol, n-butanol, isobutanol, ethylene glycol, glycerol acetone, acetonitrile, dioxane, tetrahydrofuran, dimethylformamide, dimethyl sulfoxide or a mixture thereof.

In some embodiments, the base chemical reagent(s) to form the body of the base composite may comprise at least one alkoxysilane, metal oxide precursor, or a combination thereof having a general formula of $M(OR)_4$ (M=Si, Al, Ti, In, Sn or Zr), where R comprises hydrogen, a substituted or unsubstituted alkyl or derivatives thereof. Nonlimiting examples of such chemicals includes tetramethyl orthosilicate, tetraethyl orthosilicate, tetraisopropyl orthosilicate, tetra(tert-butyl) orthosilicate, tetra(sec-butyl) orthosilicate, aluminum methoxide, aluminum ethoxide, aluminum isopropoxide, aluminum tert-butoxide, aluminum tri-sec-butoxide, titanium methoxide, titanium ethoxide, titanium isopropoxide, titanium tert-butoxide, titanium tri-sec-butoxide and derivatives bearing similar structures.

In some embodiments, the chelating agent(s) to enhance homogeneity of the organic material(s) in the solution may comprise at least one alkoxysilane, metal oxide precursor, or a combination thereof having a general formula of $M(OR)_x R'_y R''_z$ (M=Si, Al, In, Sn or Ti; x is the integer 1, 2 or 3; y is the integer 0, 1 or 2; z is the integer 1, 2 or 3, provided that the sum of x, y and z equals 4), where R comprises hydrogen, a substituted or unsubstituted alkyl or derivatives thereof; R' comprises hydrogen, a substituted or unsubstituted alkyl or derivatives thereof and R" comprises a substituted or unsubstituted alky or alkenyl group comprising from 3 to 20 carbon atoms. Nonlimiting examples of such chemicals include trimethoxyphenylsilane, dimethoxymethylphenylsilane, methoxydimethylphenylsilane, trimethoxyphenethylsilane, dimethoxymethylphenethylsilane, methoxydimethylphenethylsilane, trimethoxyoctylsilane, dimethoxymethyloctylsilane, methoxydimethyloctylsilane, trimethoxydodecylsilane, dimethoxymethyldodecylsilane, methoxydimethyldodecylsilane, trimethoxydecylsilane, dimethoxymethyldecylsilane, methoxydimethyldecylsilane, trimethoxyoctadecylsilane, dimethoxymethyloctadecylsilane, methoxydimethyloctadecylsilane, trimethoxyhexylsilane, dimethoxymethylhexylsilane, methoxydimethylhexylsilane, trimethoxy(cyclohexylmethyl)silane, dimethoxymethyl(cyclohexylmethyl)silane, methoxydimethyl(cyclohexylmethyl)silane, triethoxyphenylsilane, diethoxymethylphenylsilane, ethoxydimethylphenylsilane, triethoxyphenethylsilane, diethoxymethylphenethylsilane, ethoxydimethylphenethylsilane, triethoxyoctylsilane, diethoxymethyloctylsilane, ethoxydimethyloctylsilane, triethoxydodecylsilane, diethoxymethyldodecylsilane, ethoxydimethyldodecylsilane, triethoxydecylsilane, diethoxymethyldecylsilane, ethoxydimethyldecylsilane, triethoxyoctadecylsilane, diethoxymethyloctadecylsilane, ethoxydimethyloctadecylsilane, triethoxyhexylsilane, diethoxymethylhexylsilane, ethoxydimethylhexylsilane, triethoxy(cyclohexylmethyl)silane, diethoxymethyl(cyclohexylmethyl)silane, ethoxydimethyl(cyclohexylmethyl)silane and derivatives bearing similar structures.

In some embodiments, the chelating agent(s) to enhance homogeneity of the inorganic material(s) in the solution may comprise at least one alkoxysilane, metal oxide precursor, or a combination thereof having a general formula of $M(OR)_x R'_y R''_z$ (M=Si, Al, In, Sn or Ti; x is the integer 1, 2 or 3; y is the integer 0, 1 or 2; z is the integer 1, 2 or 3, provided that the sum of x, y and z equals 4), where R comprises hydrogen, a substituted or unsubstituted alkyl or derivatives thereof; R' comprises hydrogen, a substituted or unsubstituted alkyl or derivatives thereof and R" comprises a substituted or unsubstituted amine (including primary, secondary and tertiary) or thiol. Nonlimiting examples of such chemicals includes 3-aminopropyltrimethoxysilane, 3-aminopropyltriethoxysilane, 2-aminoethyltrimethoxysilane, 2-aminoethyltriethoxysilane, N-methylaminopropyltrimethoxysilane, N-methylaminopropyltriethoxysilane 4-aminobutylmethyldimethoxysilane, 4-aminobutylmethyldiethoxysilane, 3-aminopropyldimethylmethoxysilane, 3-aminopropyldimethylethoxysilane, 3-aminopropylmethyldimethoxysilane, 3-aminopropylmethyldiethoxysilane, N,N-dimethyl-3-aminopropyltrimethoxysilane, N,N-dimethyl-3-aminopropyltriethoxysilane, N,N-diethyl-3-aminopropyltrimethoxysilane, N,N-diethyl-3-aminopropyltriethoxysilane, N,N-diethylaminomethyltrimethoxysilane, N,N-diethylaminomethyltriethoxysilane, bis(2-hydroxyethyl)-3-aminopropyltrimethoxysilane, bis(2-hydroxyethyl)-3-aminopropyltriethoxysilane, N-(2'-aminoethyl)-3-aminopropyltrimethoxysilane, N-(2'-aminoethyl)-3-aminopropyltriethoxysilane, N-butyl-3-aminopropyltrimethoxysilane, N-butyl-3-aminopropyltriethoxysilane, N-octyl-3-aminopropyltrimethoxysilane, N-octyl-3-aminopropyltriethoxysilane, N-cyclohexyl-3-aminopropyltrimethoxysilane, N-cyclohexyl-3-aminopropyltriethoxysilane, N-(3'-trimethoxysilylpropyl)-piperazine, N-(3'-triethoxysilylpropyl)-piperazine, N-(3'-trimethoxysilylpropyl)morpholine, N-(3'-triethoxysilylpropyl)morpholine, bis(3-trimethoxysilylpropyl)amine, bis(3-triethoxysilylpropyl)amine, tris(3-trimethoxysilylpropyl)amine, tris(3-triethoxysilylpropyl)amine, N-methyl-N-butyl-3-aminopropyltrimethoxysilane, N-methyl-N-butyl-3-aminopropyltriethoxysilane, N-(3'-aminopropyl)-3- aminopropyltrimethoxysilane, N-(3'-aminopropyl)-3-aminopropyltriethoxysilane, N-phenyl-3-aminopropyltrimethoxysilane, N-phenyl-3-aminopropyltriethoxysilane, 3-mercaptopropyltrimethoxysilane, 3-mercaptopropyltriethoxysilane and derivatives bearing similar structures.

In some embodiments, the bonding agent(s) to aid bonding of the organic/inorganic composite to a desired surface may comprise at least one alkoxysilane, metal oxide precursor, or a combination thereof having a general formula of $M(OR)_xR'_yR''_z$ (M=Si, Al, In, Sn or Ti; x is the integer 1, 2 or 3; y is the integer 0, 1 or 2; z is the integer 1, 2 or 3, provided that the sum of x, y and z equals 4), where R comprises hydrogen, a substituted or unsubstituted alkyl or derivatives thereof; R' comprises hydrogen, a substituted or unsubstituted alkyl or derivatives thereof and R'' comprises a substituted or unsubstituted epoxy or glycidoxy. Nonlimiting examples of such chemicals includes 2-(3,4-epoxycyclohexyl)ethyltrimethoxysilane, 2-(3,4-epoxycyclohexyl)ethyltriethoxysilane, 5,6-epoxyhexyltrimethoxysilane, 5,6-epoxyhexyltriethoxysilane, glycidoxymethyltrimethoxysilane, glycidoxymethyltriethoxysilane, 2-glycidoxyethyltrimethoxysilane, 2-glycidoxyethyltriethoxysilane, 3-glycidoxypropyltrimethoxysilane, 3-glycidoxypropyltriethoxysilane, 4-glycidoxybutyltrimethoxysilane, 4-glycidoxybutyltriethoxysilane and derivatives bearing similar structures.

In some embodiments, the plasticizer(s) to maintain elasticity of the base composite may comprise at least one alkoxysilane, metal oxide precursor, or a combination thereof having a general formula of $M(OR)_{4-x}R'_x$ (M=Si, Al, In, Sn or Ti; x is the integer 1, 2 or 3), where R comprise hydrogen, a substituted or unsubstituted alkyl or derivatives thereof and R' comprise a substituted or unsubstituted alkyl, a substituted or unsubstituted alkenyl, a substituted or unsubstituted alkynyl, a substituted or unsubstituted aryl or derivatives thereof. Nonlimiting examples of such chemicals includes trimethoxymethylsilane, dimethoxydimethylsilane, methoxytrimethylsilane, trimethoxyethylsilane, dimethoxydiethylsilane, methoxytriethylsilane, trimethoxypropylsilane, dimethoxydipropylsilane, methoxytripropylsilane, trimethoxyisobutylsilane, triethoxyisobutylsilane, dimethoxydiisobutylsilane, diethoxydiisobutylsilane, trimethoxyphenylsilane, dimethoxydiphenylsilane, methoxytriphenylsilane, trimethoxyphenethylsilane, dimethoxydiphenethylsilane, methoxytriphenethylsilane, triethoxymethylsilane, diethoxydimethylsilane, ethoxytrimethylsilane, triethoxyethylsilane, diethoxydiethylsilane, ethoxytriethylsilane, triethoxypropylsilane, diethoxydipropylsilane, ethoxytripropylsilane, triethoxyphenylsilane, diethoxydiphenylsilane, ethoxytriphenylsilane, triethoxyphenethylsilane, diethoxydiphenethylsilane, ethoxytriphenethylsilane and derivatives bearing similar structures.

In some embodiments, the viscosity modifier(s) to achieve a desired viscosity for the solution may comprise at least one alkylsiloxane in oligomer/co-oligomer form, polymer/co-polymer form, or a combination thereof having a general formula of

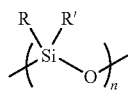

and average molecular weight equal to or between 100 to 100,000 Da, where R and R' can be the same or different and comprise hydrogen, a substituted or unsubstituted alkyl or derivatives thereof. Nonlimiting examples of such chemicals include 3-aminopropyl-terminated poly(dimethylsiloxane), chlorine-terminated poly(dimethylsiloxane), glycidyl ether-terminated poly(dimethylsiloxane), hydride-terminated poly(dimethylsiloxane), hydroxy-terminated poly(dimethylsiloxane), hydroxyalkyl-terminated poly(dimethylsiloxane), vinyl-terminated poly(dimethylsiloxane), trimethylsilyl-terminated poly(dimethylsiloxane) and derivatives bearing similar structures.

In some embodiments, one or more functional inorganic material additives may be added into the composite solution for composite coatings that do not impair or only have a limited effect on the original functions of the coatings. Here the functional additives may have the properties of, but are not limited to, UV absorbing or blocking, anti-reflective, anti-abrasion, fire-retardant, conducting, anti-microbial, anti-bacterial, anti-fungal benefits or pigmentation. The additives can be composed of, but are not limited to, organic/inorganic molecules/polymers having molecular weight up to about 100,000 Da, organic micro/nano materials in their natural or synthetic forms (e.g. particles, nanotubes and nanosheets) having sizes equal to or between about 2 nm to 500 μm; metal/metal oxide micro/nano materials (e.g. silver, titanium oxide, zinc oxide, aluminum oxide, iron oxide, selenium oxide, tellurium oxide and clay, which may be composed of kaolinite, montmorillonite, illite or chlorite) in their natural or synthetic forms (e.g. particles, nanotubes and nanosheets) having sizes equal to or between about 2 nm to 500 μm; and combinations thereof.

In some embodiments, one or more pigments, which do not impair or only have a limited effect on the original functions of the materials laminates, may be added into the composite solution for composite coatings. Such pigments may include materials that change the color of reflected or transmitted light as the result of wavelength-selective absorption. Nonlimiting examples include the range of wavelengths humans can or cannot perceive, such as visible light having wavelength from approximately 390 to 700 nm; ultraviolet light having wavelengths approximately 100 to 390 nm and infrared radiation having wavelength from approximately 700 nm to 1 mm. The pigments may include, but are not limited to, metal-based inorganic pigments containing metal elements such as Cadmium, Chromium, Cobalt, Copper, Iron oxide, Lead, Manganese, Mercury, Titanium, Tellurium, Selenium and Zinc; other inorganic pigments such as Carbon, Clay earth and Ultramarine; organic pigments such as alizarin, alizarin crimson, gamboge, carmine, purpurin, indigo, Indian yellow, Tyrian purple, quinacridone, magenta, phthalo green, phthalo blue, diarylide yellow, pigment red, pigment yellow, pigment green, pigment blue and other inorganic or organic derivatives thereof. In some embodiments, pigments also include materials that protect the host composite against the degradation caused by exposure to ultraviolet radiation, such as ultraviolet light absorbers, e.g. 2-hydroxyphenyl-benzophenones, 2-(2-hydroxyphenyl)-benzotriazole and 2-hydroxyphenyl-s-triazines derivatives; hindered-amine light stabilizers, e.g. tetramethyl piperidine derivatives and antioxidants, e.g. sterically hindered phenols, phosphites and thioethers. In some embodiments, pigments also include materials that emit colors, such as through fluorescence, phosphorescence, and/or other forms of luminescence. Such pigments may include, but are not limited to, fluorophores, such as Fluorescein, Rhodamine, Coumarin, Cyanine and their derivatives; phosphorescent dyes such as Zinc sulfide, Strontium aluminate and their derivatives.

In some embodiments, the base composite solution is prepared by mixing at least one of the solvent(s), base chemical reagents(s), chelating agent(s), bonding agent(s), plasticizer(s), viscosity modifier(s), functional additive(s) and pigment(s) in an acidic condition (pH≤5). In some embodiments, a basic form of the composite solution may comprise at least the solvent(s), base chemical reagent(s), chelating agent(s), bonding agent(s), and plasticizer(s). In some embodiments, the composite solution may optionally include viscosity modifier(s), functional additive(s) and pigment(s). In some embodiments, the composite solution may comprise 1-10 vol. % of water, 10-40 vol. % of at least one solvent(s), 30-70 vol. % of at least one base chemical reagent(s), 10-20 vol. % of at least one plasticizer(s), 1-10 vol. % of at least one bonding agent(s), and the rest of the volume may comprise at least one of the chelating agent(s), the viscosity modifier(s), the functional additive(s) and the pigment(s). In some embodiments, the composite solution may comprise 3-8 vol. % of water, 20-30 vol. % of at least one solvent(s), 40-60 vol. % of at least one base chemical reagent(s), 15-20 vol. % of at least one plasticizer(s), 5-10 vol. % of at least one bonding agent(s), and the remaining volume may comprise any optional additives. In some embodiments, the composite solution is similar to the embodiments above, but the concentration of plasticizer(s) is greater than 15 vol. %, or more preferably greater than 20 vol. %. In some embodiments, the composite solution is similar to the embodiments above, but the concentration of bonding agent(s) is greater than 5 vol. %, or more preferably greater than 10 vol. %. The mixture of the aforementioned chemical agents may be stirred at elevated temperature equal to or between 50 to 100° C. for about ½ hour to 10 days, or preferably equal to or between 50 to 70° C. for about ½ hour to 12 hours. In some embodiments, the base composite solution is further diluted with more solvent(s) to a final concentration equal to or between 5 and 60 vol. % to form the final composite solution for material coatings. In some embodiments, the base composite solution is further diluted with more solvent(s) to a final concentration equal to or between 5 and 40 vol. %, or more preferably equal to or between 5 and 20%. With coated textiles and fabric materials, it is preferable to maintain the same feel and texture as before the coating process. Thus, a low final concentration for the base composite solution is preferable. In some embodiments, the organic/inorganic composite solution is at least partial hydrolyzed or completely hydrolyzed.

In contrast to other conventional coating solutions for textiles materials, due to high concentration of chelating agents and plasticizers for flexibility, the base composite solution discussed herein maintains or nearly maintains the original feel and texture of the textile or fabric before the coating process. Further, the coated textile or fabric materials are wrinkle resistant (i.e. minimize or prevent creasing of the fabric). In some embodiments, the degree of polymerization of the sol-gel components is equal to or less than 100, equal to or less than 10, or equal to or less than 5. The degree of polymerization of the final sol-gel compositions can be controlled by the amount of the common linker molecular (e.g. water). Additionally, the base composite solution readily bonds to the textile materials due to the affinity to polar moieties commonly existed in the textile materials (e.g. hydroxy groups in cellulose and polyester; amine and amide groups in Nylon, etc.), thereby anchoring the formed coating to the textile materials. Further, the coating formed from the base composite solution allows second stage treatments (e.g. hydrophobic solution treatments) to easily bond to textiles, whereas other hydrophobic solutions do not bond well to textiles. Thus, the composite solution may serve as a primer to a second stage treatment with a hydrophobic solution.

Further, the composite solution and/or the hydrophobic solution discussed further below are fluorine-free, thereby avoiding the use of harmful chemicals. While polymers with fluorine may have very low surface energies that aid hydrophobicity, fluorine-free polymers generally have higher surface energies than polymers with fluorine that make it difficult to achieve hydrophobic coatings. However, the use of the composite solution acting as a primer for a hydrophobic solution discussed further below allows a fluorine-free hydrophobic/superhydrophobic coating to be achieved.

In some embodiments, after the substrate is treated with the sol-gel process, the resulting surface may also be treated with hydrophobic chemical agents and/or other chemical agents, which renders the surface hydrophobic/superhydrophobic and may also generates nanoscopic or microscopic topography. As a nonlimiting example of hydrophobic chemical agents used as coating in Step 3 includes at least one type of alkylsilane covalently bonded to the resulting surface, which renders the surface hydrophobic/superhydrophobic and also generates nanoscopic or microscopic topography. In some embodiments, the hydrophobic chemical agents and/or other chemical agents may be deposited utilizing a vapor treatment. The chemical agents may be hydrophobic and may have a general formula of alkylsilane $[CH_3(CH_2)_a]_bSiR_cX_d$; where X comprise Cl, Br, I or other suitable organic leaving groups, R comprise a substituted or unsubstituted alkyl, a substituted or unsubstituted alkenyl, a substituted or unsubstituted alkynyl, a substituted or unsubstituted aryl or derivatives thereof, and a is the integer 0, 1, 2, 3 . . . to 20, b is the integer 1, 2 or 3, c is the integer 0, 1, 2, 3 and d is the integer 1, 2 or 3, provided that the sum of b, c and d equals 4. The preferred alkylsilane species may include, but are not limited to, chlorosilane, dichlorosilane, trichlorosilane, chlorotrimethylsilane, dichlorodimethylsilane, trichloromethylsilane, chlorophenylsilane, dichlorophenylsilane, trichlorophenylsilane, chloromethylphenylsilane, chlorodimethylphenylsilane, dichloromethylphenylsilane, chlorodimethylphenethylsilane, dichloromethylphenethylsilane, trichlorophenethylsilane, chlorodimethyloctylsilane, dichloromethyloctylsilane trichlorooctylsilane, chlorodimethyldodecylsilane, dichloromethyldodecylsilane, trichlorododecylsilane, chlorodecyldimethylsilane, dichlorodecylmethylsilane, trichlorodecylsilane, chlorodimethyloctadecylsilane, dichloromethyloctadecylsilane, trichlorooctadecylsilane, chlorodimethylthexylsilane, dichloromethylthexylsilane, trichlorothexylsilane, allyldichloromethylsilane, allylchlorodimethylsilane, allyltrichlorosilane, (cyclohexylmethyl)chlorodimethylsilane, (cyclohexylmethyl)dichloromethylsilane, (cyclohexylmethyl)trichlorosilane and derivatives bearing similar structures. In some embodiments, the hydrophobic chemical agent(s) may be dissolved or dispersed in one or more organic solvents. Typically, the concentration of the hydrophobic chemical agent(s) in organic solvent(s) is equal to or between 0.1 and 15 vol. %. The preferred organic solvents may include, but are not limited to, toluene, benzene, xylene, trichloroethylene, 1,2-dichloroethane, dichloromethane, chloroform, carbon tetrachloride, tetrachloroethylene, n-propyl bromide, diethyl ether, acetone, diisopropyl ether, methyl-t-butyl ether, petroleum ethers and petroleum hydrocarbons. Other chemical agents may also be used alone or in conjunction with alkylsilanes to perform similar tasks to render the surface hydrophobic and/or to generate nanoscopic topography.

In some embodiments, an example of hydrophobic chemical agents used as coating in Step 3 includes at least one type of alkoxyalkylsilane covalently bonded to the resulting surface, which renders the surface hydrophobic/superhydrophobic and also generates nanoscopic topography. The hydrophobic chemical agents used may have a general formula of alkoxyalkylsilane $[CH_3(CH_2)_a]_b SiR_c[alkoxy]_d$; where [alkoxy] comprise methoxy, ethoxy, propoxy, isopropoxy, butoxy, isobutoxy, or a combination thereof; R comprise a substituted or unsubstituted alkyl, a substituted or unsubstituted alkenyl, a substituted or unsubstituted alkynyl, a substituted or unsubstituted aryl or derivatives thereof, and a is the integer 0, 1, 2, 3 . . . to 20, b is the integer 1, 2 or 3, c is the integer 0, 1, 2, 3 and d is the integer 1, 2 or 3, provided that the sum of b, c and d equals 4. In some embodiments, the hydrophobic chemical agent may be dissolved or dispersed in an organic solvent or a mixture of organic solvents. Typically, the concentration of the hydrophobic chemical agent(s) in organic solvent(s) is equal to or between 0.1 and 15 vol. %. The preferred alkoxyalkylsilane species may include, but are not limited to, trimethoxyisobutylsilane, triethoxyisobutylsilane, dimethoxydiisobutylsilane, diethoxydiisobutylsilane, trimethoxyphenylsilane, triethoxyphenylsilane, dimethoxydiphenylsilane, diethoxydiphenylsilane, dimethoxymethylphenylsilane, diethoxymethylphenylsilane, methoxydimethylphenylsilane, ethoxydimethylphenylsilane, trimethoxy(hexyl)silane, triethoxy(hexyl)silane, tripropoxy(hexyl)silane, triisopropoxy(hexyl)silane, trimethoxy(octyl)silane, triethoxy(octyl)silane, tripropoxy(octyl)silane, triisopropoxy(octyl)silane, trimethoxy(decyl)silane, triethoxy(decyl)silane, tripropoxy(decyl)silane, triisopropoxy(decyl)silane, trimethoxy(dodecyl)silane, triethoxy(dodecyl)silane, tripropoxy(dodecyl)silane, triisopropoxy(dodecyl)silane and derivatives bearing similar structures. The preferred organic solvents may include, but are not limited to, methanol, ethanol, n-propanol, isopropanol, n-butanol, isobutanol, acetone, acetonitrile, dioxane, tetrahydrofuran, tetrachloroethylene, n-propyl bromide, dimethylformamide, dimethyl sulfoxide and water. Other chemical agents may also be used alone or in conjunction with alkoxyalkylsilanes to perform similar tasks to render the surface hydrophobic and/or to generate nanoscopic topography.

In some embodiments, the alkoxyalkylsilane $[CH_3(CH_2)_a]_b SiR_c[alkoxy]_d$ is chemically converted from alkylsilane $[CH_3(CH_2)_a]_b SiR_c X_d$ by mixing and heating the fluoroalkylsilane in the correspondent solvent(s) (e.g. methanol, ethanol, isopropanol and water). The mixture of the thereof chemical agents is preferred to be stirred at elevated temperature equal to or between 50 to 100° C. for about 1 hour to 7 days in an acidic environment (pH≤1) and the solutions were neutralized with KOH (may contain up to 15% (w/w) of water) until the pH level is equal to or between 6 and 8. The hydrophobic solutions were used directly or further diluted in appropriate solvent(s) (e.g. methanol, ethanol, isopropanol, denatured ethanol, water, etc.).

Notably, the components of the composite coatings discussed herein, including the various additives, are fluorine-free and do not comprise any fluorine. The use of chemical compositions that are fluorine-free avoids the associated environmental and health risks of fluorine containing materials.

In some embodiments, the target surface of materials may be activated before the deposition of the organic/inorganic composite solution. The surface activation may be achieved by reaction with ozone, oxygen, hydrogen peroxide, halogens, other reactive oxidizing species, or combinations thereof. The purpose is to create an energetically reactive surface, increase the concentration of free radicals and to bind molecules on the surface covalently. In some embodiments, the surface activation may be achieved by ozone plasma generated by intense UV light. In other embodiments, surface activation may be achieved by plasma treatment. In yet another embodiment, surface activation may be achieved by ozone generation using a corona discharge, flame, or plasma.

In some embodiment, as a nonlimiting example, the organic/inorganic composite solution may be deposited on the surface of textile materials by methods including, but not limited to, spraying, misting, doctor-blading, padding, foaming, rolling or inkjet printing. As another nonlimiting example, the materials may be dipped into the solution for a set period of time equal to or between about 1 second and 24 hour. The solvent may then be removed from the materials, and the materials may be dried or cured at a set temperature equal to or between about 25 and 200° C. As used herein, the term "cure," "cured" or similar terms, as used in connection with a cured or curable composition is intended to mean that at least a portion of the polymerizable and/or crosslinkable components that form the curable composition is at least partially polymerized and/or crosslinked. In certain embodiments, the crosslink density of the crosslinkable components of the composite solution and/or hydrophobic solution, e.g., the degree of crosslinking can range from 1% to 100% of complete crosslinking.

In some embodiments, as a nonlimiting example, the resulting coatings may be treated with the hydrophobic chemical agent(s) to increase the surface hydrophobicity of the resulting organic/inorganic nanocomposite. The coated materials are first placed in an enclosed environment where the hydrophobic chemical agent(s) are evaporated onto the articles by heating at the temperature equal to or between 25 and 200° C.

In some embodiment, as a nonlimiting example, the hydrophobic chemical solution may be deposited on the surface of textile materials by methods including, but not limited to, spraying, misting, doctor-blading, padding, foaming, rolling or inkjet printing. As another nonlimiting example, the materials may be dipped into the solution for a set period of time equal to or between about 1 second and 24 hour. The solvent may then be removed from the materials, and the materials may be dried or cured at a set temperature equal to or between about 25 and 200° C. In certain embodiments, the crosslink density of the crosslinkable components, e.g., the degree of crosslinking can range from 1% to 100% of complete crosslinking.

In some embodiments, the organic/inorganic composite solution deposited (including the optional hydrophobic chemicals or other additives) on the surface of textile materials after curing produce a protective interpenetrating layer with the textile materials. The protective layer may increase the strength of the textile materials and make them more resilient to physical stresses such as stretching, bending, compressing, puncturing and impact. An interpenetration polymer network is a combination of two or more polymers in network form which are synthesized in juxtaposition. Thus, there is some type of interpenetration form finely divided phases. The two or more polymer are at least partially interlaced on a polymer scale, but not covalently bonded to each other. The network cannot be separated unless chemical bonds are broken. The two or more networks can be envisioned to be entangled in such a way that they are concatenated and cannot be pulled apart, but not bonded to each other by any chemical bond. The interpenetration polymer network may exhibit dual phase continuity, which means that two/three or more polymers/oligomers/dimers in the system form phases that are continuous on a macroscopic scale.

In some embodiment, the resulting treated textile materials are easier to clean, where particulates and other staining agents are more easily removed. In some embodiment, it is evident that the improvement of natural and renewable sourced materials or textiles to resist degradation (e.g. weathering, mold and rot) and may lead to the replacement of standard plastic-based counterparts thus reducing the demand on a finite fossil-fuel based resource used in their manufacture.

In some embodiment, the resulting treated textile materials exhibit water-repellent property, i.e. the aqueous liquid repellency grades (according to standard AATCC Test Method 193-2012) of the treated textile materials is at least 1, usually equal to or between 2 and 8. In some embodiment, the resulting treated textile materials exhibit soil- and stain-resistant properties, i.e. the stain resistance (according to standard AATCC Test Method 175-2003) of the treated textile materials is at least higher than 1, usually equal to or between 2 and 10. In some embodiment, the resulting treated textile materials are easier to clean. For example, the treated textile material may require less washing cycles to remove the stain, which reduces cleaning time; require less water and detergents to clean, which reduces resources utilized; or require less machine washing power and time (e.g. gentle cycle rather than normal cycle) to clean, which reduces energy consumed. In some embodiment, the resulting treated textile materials are easier to dry, i.e. they required less time or lower temperature in the drier to dry, which saves time and energy. In some embodiment, the resulting treated textile materials are easier to clean using vacuum cleaners or the like, thereby allowing for the use of lower powered apparatuses or less time spent on the cleaning process, which saves energy and increases apparatus lifetime.

Experimental Procedures and Test Results

Below are detailed descriptions of the standardized test methods used to evaluate the efficacy of treated samples in regard to aqueous liquid repellency and stain-resistance. The treatments were done on specific denier fibers but can vary depending on the number of filaments and size of the denier and so the AATCC and Ford test results may vary. When testing carpet or other three-dimensional filaments, the length and density may also alter the AATCC results.

AATCC Test Method 193-2012 (Aqueous Liquid Repellency: Water/Alcohol Solution Resistance Test): The purpose of this test method is to determine the efficacy of coatings that can reduce the effective surface energy of an arbitrary fabric/carpet material in regard to the treated surface's ability to resist wetting by a specific series of water/isopropanol solutions. This test method implements 8 aqueous isopropanol solutions, numbered 1 to 8 of varying volumetric ratios (1=largest water: i-PrOH volumetric ratio and 8=smallest water:i-PrOH volumetric ratio), which correspond to different surface energies. The test is conducted by placing a minimum of three 0.050 mL drops of solution, beginning with the lowest numbered test solution, and spaced ~4.0 cm apart from one another with the applicator tip held at a height of ~0.60 cm above the surface of a flat test specimen. In order to receive a passing grade, the test solution must remain on the surface of the test specimen for 10±2.0 seconds without darkening, wetting, or wicking into the fibers of the test specimen. Correspondingly, the aqueous liquid repellency grade of the test specimen is the highest numbered test solution that receives a passing grade.

AATCC Test Method 175-2003 (Stain Resistance: Pile Floor Coverings): The purpose of this test method is to determine the stain resistance of a fabric material by an acidic dye. The test method can also be used to determine the efficacy of a fabric material/carpet that has been treated with an anti-staining agent. The test method is conducted by applying 20 mL of a diluted aqueous solution of allura red (FD&C Red 40) into the center of a staining ring placed atop a flat test specimen. A stain cup that fits inside of the staining ring is used to push the staining solution into the tufts of carpets with five cycles of an up and down motion to promote staining. Rather than using the prescribed aqueous allura red solution, red (fruit punch) Gatorade was used as a staining agent, which is an accepted alternative. The wetted test specimen is left unperturbed for 24±4.0 hours. To remove the stain, the test specimen is rinsed under running water while rubbing the stain site until the rinsing water is devoid of staining agent. Prior to evaluation, the test specimen is oven dried at 100±5° C. for 90 minutes. The resulting stained test specimen is evaluated in accordance with the AATCC Red 40 Stain Scale. Each test specimen may receive an AATCC Red 40 Stain Scale grade of 1.0-10 (1.0=severely stained and 10=no staining).

Ford Laboratory Test Method BN 112-08 (Soiling & Cleanability Test for Interior Trim Materials): The purpose of this test method is to evaluate the cleanability of automatic interior trim materials, including carpets and fabrics. The staining solution used in this test method is prepared by solvating 2.00 g of Nescafe Original/Classic instant coffee in 100 mL of boiling water. The test method is conducted by placing 2.00 mL of a coffee staining solution at a temperature of 65° C. onto a flat test specimen and allowing it to remain unperturbed for one hour at room conditions. After one hour, white blotting paper is used to remove as much of the coffee solution from the specimen as possible. This process is repeated until no more coffee solution can be removed from the test specimen. Subsequently, a cleaning agent (Resolve Triple Action Spot Carpet Cleaner) is applied to half of the stain site and allowed to remain there for 3 to 5 minutes. After 3 to 5 minutes, white blotting paper is again used to rub away any staining that has been removed by the carpet cleaner for one minute at 1 to 2 cycles per second. The degree of stain removal is evaluated in accordance with AATCC Evaluation Procedure 2/ISO 105-A03. An AATCC Evaluation Procedure 2/ISO 105-A03 grade of 1.00-5.00 may be assigned to a test specimen (1.00=stain can be almost entirely removed and 5.00=stain cannot be removed).

The following describes a fluorine-free two-stage treatment process for imparting carpets with hydrophobic, stain-resistant, and soiling-resistant properties.

Example I

For the first-stage solution, a sol-gel composite solution comprised of a mixture of a structural base reagent (tetraethyl orthosilicate), a plasticizer (trimethoxypropylsilane), an bonding agent (3-glicydyloxypropyltrimethoxysilane), and solvents (methanol and water) was prepared under an acidic conditions (pH=5, adjusted with HCl) by mixing the aforementioned chemicals. The resulting solution was diluted with methanol. This solution was then used to treat a nylon 6,6-based carpet sample of dimensions 4"×4" by immersing the sample in the solution bath. Excess solution was removed by suspending the saturated sample in the air with the tufts of the carpet oriented orthogonal to the local vertical. Enough solution was drained from the sample to attain a target %-weight pick-up ranging between 150% (wt./wt.)-200% (wt./wt.). The carpet sample was then allowed to air dry/cure prior to the deposition of the second-stage solution. The second-stage solution was prepared by dispersing enough of a hydrophobic chemical reagent (trichloro(octyl)silane) into an aqueous methanol solution to yield a 2.0% (v./v.) trimethoxy(octyl)silane solution. The second stage solution was allowed to mix under an acidic condition (pH≤1). After heated mixing, the solution was neutralized with KOH (may contain up to 15% (wt./wt.) of water) until the pH reached between 6 and 8. The second-stage solution was allowed to settle prior to filtration to remove excess insoluble salts. The second-stage solution mentioned above was then used to treat the nylon 6,6-based sample previously treated with the first-stage solution by immersing the sample in the second-stage solution bath. Excess solution was removed by suspending the saturated sample in the air with the tufts of the carpet oriented orthogonal to the local vertical. Enough solution was drained from the sample to attain a target %-weight pick-up ranging between 150% (wt./wt.)-200% (wt./wt.). The carpet sample was then allowed to air dry/cure prior to efficacy evaluation. The following test methods were conducted to evaluate the surface energy of the treated sample at the carpet-air interface and stain-resistant properties: AATCC Test Method 193-2012, AATCC Test Method 175-2003 and Ford Laboratory Test Method BN 112-08. Correspondingly, the treated sample received an ALR grade of 4.0, an AATCC Red 40 Stain Scale grade of 6.0, and an AATCC Evaluation Procedure 2/ISO 105-A03 grade of 4.5. For reference, the untreated sample received an ALR grade of 0, an AATCC Red 40 Stain Scale grade of 1.5, and an AATCC Evaluation Procedure 2/ISO 105-A03 grade of 5.0.

Example II

For the first-stage solution, a sol-gel composite solution comprised of a mixture of a structural base reagent (tetraethyl orthosilicate), a plasticizer (trimethoxypropylsilane), an bonding agent (3-glicydyloxypropyltrimethoxysilane), and solvents (methanol and water) was prepared under an acidic conditions (pH=5, adjusted with HCl) by mixing the aforementioned chemicals. The resulting solution was diluted with methanol. This solution was then used to treat a nylon 6,6-based carpet sample of dimensions 4"×4" by immersing the sample in the solution bath. Excess solution was removed by suspending the saturated sample in the air with the tufts of the carpet oriented orthogonal to the local vertical. Enough solution was drained from the sample to attain a target %-weight pick-up ranging between 150% (wt./wt.)-200% (wt./wt.). The carpet sample was then allowed to air dry/cure prior to the deposition of the second-stage solution. The second-stage solution was prepared by dispersing enough of a hydrophobic chemical reagent (trichloro(octyl)silane) into an aqueous methanol solution to yield a 3.0% (v./v.) trimethoxy(octyl)silane solution. The second stage solution was allowed to under an acidic condition (pH<1). After heated mixing, the solution was neutralized with KOH (may contain up to 15% (wt./wt.) of water) until the pH reached between 6 and 8. The second-stage solution was allowed to settle prior to filtration to remove excess insoluble salts. The second-stage solution mentioned above was then used to treat the nylon 6,6-based sample previously treated with the first-stage solution by immersing the sample in the second-stage solution bath. Excess solution was removed by suspending the saturated sample in the air with the tufts of the carpet oriented orthogonal to the local vertical. Enough solution was drained from the sample to attain a target %-weight pick-up ranging between 150% (wt./wt.)-200% (wt./wt.). The carpet sample was then allowed to air dry/cure prior to efficacy evaluation. The following test methods were conducted to evaluate the surface energy of the treated sample at the carpet-air interface and stain-resistant properties: AATCC Test Method 193-2012, AATCC Test Method 175-2003 and Ford Laboratory Test Method BN 112-08. Correspondingly, the treated sample received an ALR grade of 5.0, an AATCC Red 40 Stain Scale grade of 6.0, and an AATCC Evaluation Procedure 2/ISO 105-A03 grade of 4.5.

Example III

For the first-stage solution, a sol-gel composite solution comprised of a mixture of a structural base reagent (tetraethyl orthosilicate), a plasticizer (trimethoxypropylsilane), an bonding agent (3-glicydyloxypropyltrimethoxysilane), and solvents (methanol and water) was prepared under an acidic conditions (pH=5, adjusted with HCl) by mixing the aforementioned chemicals. The resulting solution was diluted with methanol. This solution was then used to treat a nylon 6,6-based carpet sample of dimensions 4"×4" by immersing the sample in the solution bath. Excess solution was removed by suspending the saturated sample in the air with the tufts of the carpet oriented orthogonal to the local vertical. Enough solution was drained from the sample to attain a target %-weight pick-up ranging between 150% (wt./wt.)-200% (wt./wt.). The carpet sample was then allowed to air dry/cure prior to the deposition of the second-stage solution. The second-stage solution was prepared by dispersing enough of a hydrophobic chemical reagent (trichloro(octyl)silane) into an aqueous methanol solution to yield a 4.0% (v./v.) trimethoxy(octyl)silane solution. The second stage solution was allowed to mix under an acidic condition (pH<1). After heated mixing, the solution was neutralized with KOH (may contain up to 15% (wt./wt.) of water) until the pH reached between 6 and 8. The second-stage solution was allowed to settle prior to filtration to remove excess insoluble salts. The second-stage solution mentioned above was then used to treat the nylon 6,6-based sample previously treated with the first-stage solution by immersing the sample in the second-stage solution bath. Excess solution was removed by suspending the saturated sample in the air with the tufts of the carpet oriented orthogonal to the local vertical. Enough solution was drained from the sample to attain a target %-weight pick-up ranging between 150% (wt./wt.)-200% (wt./wt.). The carpet sample was then allowed to air dry/cure prior to efficacy evaluation. The following test methods were conducted to evaluate the surface energy of the treated sample at the carpet-air interface and stain-resistant properties: AATCC Test Method 193-2012, AATCC Test Method 175-2003 and Ford Laboratory Test Method BN 112-08. Correspondingly, the treated sample received an ALR grade of 4.0, an AATCC Red 40 Stain Scale grade of 6.0, and an AATCC Evaluation Procedure 2/ISO 105-A03 grade of 4.5.

Example IV

For the first-stage solution, a sol-gel composite solution comprised of a mixture of a structural base reagent (tetraethyl orthosilicate), a plasticizer (trimethoxypropylsilane), an bonding agent (3-glicydyloxypropyltrimethoxysilane), and solvents (methanol and water) was prepared under an acidic conditions (pH=5, adjusted with HCl) by mixing the aforementioned chemicals. The resulting solution was diluted with methanol. This solution was then used to treat a nylon 6,6-based carpet sample of dimensions 4"×4" by immersing the sample in the solution bath. Excess solution was removed by suspending the saturated sample in the air with the tufts of the carpet oriented orthogonal to the local vertical. Enough solution was drained from the sample to attain a target %-weight pick-up ranging between 150% (wt./wt.)-200% (wt./wt.). The carpet sample was then allowed to air dry/cure at room conditions prior to the deposition of the second-stage solution. The second-stage solution was prepared by dispersing enough of a hydrophobic chemical reagent (trichlorooctylsilane) into an aqueous methanol solution to yield a 5.0% (v./v.) trimethoxyoctylsilane solution. The second stage solution was allowed to mix under an acidic condition (pH<1). After heated mixing, the solution was neutralized with KOH (may contain up to 15% (wt./wt.) of water) until the pH reached between 6 and 8. The second-stage solution was allowed to settle prior to filtration to remove excess insoluble salts. The second-stage solution mentioned above was then used to treat the nylon 6,6-based sample previously treated with the first-stage solution by immersing the sample in the second-stage solution bath. Excess solution was removed by suspending the saturated sample in the air with the tufts of the carpet oriented orthogonal to the local vertical. Enough solution was drained from the sample to attain a target %-weight pick-up ranging between 150% (wt./wt.)-200% (wt./wt.). The carpet sample was then allowed to air dry/cure prior to efficacy evaluation. The following test methods were conducted to evaluate the surface energy of the treated sample at the carpet-air interface and stain-resistant properties: AATCC Test Method 193-2012, AATCC Test Method 175-2003 and Ford Laboratory Test Method BN 112-08. Correspondingly, the treated sample received an ALR grade of 4.0, an AATCC Red 40 Stain Scale grade of 6.0, and an AATCC Evaluation Procedure 2/ISO 105-A03 grade of 4.5.

Example V

For the first-stage solution, a sol-gel composite solution comprised of a mixture of a structural base reagent (tetraethyl orthosilicate), a plasticizer (trimethoxypropylsilane), an bonding agent (3-glicydyloxypropyltrimethoxysilane), and solvents (methanol and water) was prepared under an acidic condition (pH=5, adjusted with HCl) by mixing the aforementioned chemicals. The resulting solution was diluted with methanol. This solution was then used to treat a nylon 6,6-based carpet sample of dimensions 4"×4" by immersing the sample in the solution bath. Excess solution was removed by suspending the saturated sample in the air with the tufts of the carpet oriented orthogonal to the local vertical. Enough solution was drained from the sample to attain a target %-weight pick-up ranging between 150% (wt./wt.)-200% (wt./wt.). The carpet sample was then allowed to air dry/cure prior to the deposition of the second-stage solution. The second-stage solution was prepared by dispersing enough of a hydrophobic chemical reagent (trichlorooctylsilane) into an aqueous mixture of methanol (MeOH) and isopropanol (i-PrOH) with a molar ratio i-PrOH:MeOH of 0.0279 to yield a 2.0% (v./v.) trimethoxyoctylsilane solution. The second stage solution was allowed to mix under an acidic condition (pH<1). After heated mixing, the solution was neutralized with KOH (may contain up to 15% (wt./wt.) of water) until the pH reached between 6 and 8. The second-stage solution was allowed to settle prior to filtration to remove excess insoluble salts. The second-stage solution mentioned above was then used to treat the nylon 6,6-based sample previously treated with the first-stage solution by immersing the sample in the second-stage solution bath. Excess solution was removed by suspending the saturated sample in the air with the tufts of the carpet oriented orthogonal to the local vertical. Enough solution was drained from the sample to attain a target %-weight pick-up ranging between 150% (wt./wt.)-200% (wt./wt.). The carpet sample was then allowed to air dry/cure prior to efficacy evaluation. The following test methods were conducted to evaluate the surface energy of the treated sample at the carpet-air interface and stain-resistant properties: AATCC Test Method 193-2012, AATCC Test Method 175-2003 and Ford Laboratory Test Method BN 112-08. Correspondingly, the treated sample received an ALR grade of 5.0, an AATCC Red 40 Stain Scale grade of 7.0, and an AATCC Evaluation Procedure 2/ISO 105-A03 grade of 4.0.

Example VI

For the first-stage solution, a sol-gel composite solution comprised of a mixture of a structural base reagent (tetraethyl orthosilicate), a plasticizer (trimethoxypropylsilane), an bonding agent (3-glicydyloxypropyltrimethoxysilane), and solvents (methanol and water) was prepared under an acidic conditions (pH=5, adjusted with HCl) by mixing the aforementioned chemicals. The resulting solution was diluted with methanol. This solution was then used to treat a nylon 6,6-based carpet sample of dimensions 4"×4" by immersing the sample in the solution bath. Excess solution was removed by suspending the saturated sample in the air with the tufts of the carpet oriented orthogonal to the local vertical. Enough solution was drained from the sample to attain a target %-weight pick-up ranging between 150% (wt./wt.)-200% (wt./wt.). The carpet sample was then allowed to air dry/cure prior to the deposition of the second-stage solution. The second-stage solution was prepared by dispersing enough of a hydrophobic chemical reagent (trichlorooctylsilane) into an aqueous mixture of methanol (MeOH) and isopropanol (i-PrOH) with a molar ratio i-PrOH:MeOH of 0.0589 to yield a 2.0% (v./v.) trimethoxyoctylsilane solution. The second stage solution was allowed to mix under an acidic conditions (pH<1). After heated mixing, the solution was neutralized with KOH (may contain up to 15% (wt./wt.) of water) until the pH reached between 6 and 8. The second-stage solution was allowed to settle prior to filtration to remove excess insoluble salts. The second-stage solution mentioned above was then used to treat the nylon 6,6-based sample previously treated with the first-stage solution by immersing the sample in the second-stage solution bath. Excess solution was removed by suspending the saturated sample in the air with the tufts of the carpet oriented orthogonal to the local vertical. Enough solution was drained from the sample to attain a target %-weight pick-up ranging between 150% (wt./wt.)-200% (wt./wt.). The carpet sample was then allowed to air dry/cure prior to efficacy evaluation. The following test methods were conducted to evaluate the surface energy of the treated sample at the carpet-air interface and stain-resistant properties: AATCC Test Method 193-2012, AATCC Test Method 175-2003 and Ford Laboratory Test Method BN 112-08. Correspondingly, the treated sample received an ALR grade of 4.0, an AATCC Red 40 Stain Scale grade of 7.25, and an AATCC Evaluation Procedure 2/ISO 105-A03 grade of 4.0.

Example VII

For the first-stage solution, a sol-gel composite solution comprised of a mixture of a structural base reagent (tetraethyl orthosilicate), a plasticizer (trimethoxypropylsilane), an bonding agent (3-glicydyloxypropyltrimethoxysilane), and solvents (methanol and water) was prepared under an acidic condition (pH=5, adjusted with HCl) by mixing the aforementioned chemicals. The resulting solution was diluted with methanol. This solution was then used to treat a nylon 6,6-based carpet sample of dimensions 4"×4" by immersing the sample in the solution bath. Excess solution was removed by suspending the saturated sample in the air with the tufts of the carpet oriented orthogonal to the local vertical. Enough solution was drained from the sample to attain a target %-weight pick-up ranging between 150% (wt./wt.)-200% (wt./wt.). The carpet sample was then allowed to air dry/cure prior to the deposition of the second-stage solution. The second-stage solution was prepared by dispersing enough of a hydrophobic chemical reagent (trichloro(octyl)silane) into an aqueous mixture of methanol (MeOH) and isopropanol (i-PrOH) with a molar ratio i-PrOH:MeOH of 0.177 to yield a 2.0% (v./v.) trimethoxy(octyl)silane solution. The second stage solution was allowed to mix under an acidic condition (pH<1). After heated mixing, the solution was neutralized with KOH (may contain up to 15% (wt./wt.) of water) until the pH reached between 6 and 8. The second-stage solution was allowed to settle prior to filtration to remove excess insoluble salts. The second-stage solution mentioned above was then used to treat the nylon 6,6-based sample previously treated with the first-stage solution by immersing the sample in the second-stage solution bath. Excess solution was removed by suspending the saturated sample in the air with the tufts of the carpet oriented orthogonal to the local vertical. Enough solution was drained from the sample to attain a target %-weight pick-up ranging between 150% (wt./wt.)-200% (wt./wt.). The carpet sample was then allowed to air dry/cure prior to efficacy evaluation. The following test methods were conducted to evaluate the surface energy of the treated sample at the carpet-air interface and stain-resistant properties: AATCC Test Method 193-2012, AATCC Test Method 175-2003 and Ford Laboratory Test Method BN 112-08. Correspondingly, the treated sample received an ALR grade of 5.0, an AATCC Red 40 Stain Scale grade of 7.5, and an AATCC Evaluation Procedure 2/ISO 105-A03 grade of 4.0.

Example VIII

For the first-stage solution, a sol-gel composite solution comprised of a mixture of a structural base reagent (tetraethyl orthosilicate), a plasticizer (trimethoxypropylsilane), an bonding agent (3-glicydyloxypropyltrimethoxysilane), and solvents (methanol and water) was prepared under an acidic condition (pH=5, adjusted with HCl) by mixing the aforementioned chemicals. The resulting solution was diluted with methanol. This solution was then used to treat a nylon 6,6-based carpet sample of dimensions 4"×4" by immersing the sample in the solution bath. Excess solution was removed by suspending the saturated sample in the air with the tufts of the carpet oriented orthogonal to the local vertical. Enough solution was drained from the sample to attain a target %-weight pick-up ranging between 150% (wt./wt.)-200% (wt./wt.). The carpet sample was then allowed to air dry/cure prior to the deposition of the second-stage solution. The second-stage solution was prepared by dispersing enough of a hydrophobic chemical reagent (trichlorooctylsilane) into an aqueous mixture of methanol (MeOH) and isopropanol (i-PrOH) with a molar ratio i-PrOH:MeOH of 0.529 to yield a 2.0% (v./v.) trimethoxyoctylsilane solution. The second stage solution was allowed to mix under an acidic condition (pH<1). After heated mixing, the solution was neutralized with KOH (may contain up to 15% (wt./wt.) of water) until the pH reached between 6 and 8. The second-stage solution was allowed to settle prior to filtration to remove excess insoluble salts. The second-stage solution mentioned above was then used to treat the nylon 6,6-based sample previously treated with the first-stage solution by immersing the sample in the second-stage solution bath. Excess solution was removed by suspending the saturated sample in the air with the tufts of the carpet oriented orthogonal to the local vertical. Enough solution was drained from the sample to attain a target %-weight pick-up ranging between 150% (wt./wt.)-200% (wt./wt.). The carpet sample was then allowed to air dry/cure prior to efficacy evaluation. The following test methods were conducted to evaluate the surface energy of the treated sample at the carpet-air interface and stain-resistant properties: AATCC Test Method 193-2012, AATCC Test Method 175-2003 and Ford Laboratory Test Method BN 112-08. Correspondingly, the treated sample received an ALR grade of 5.0, an AATCC Red 40 Stain Scale grade of 7.75, and an AATCC Evaluation Procedure 2/ISO 105-A03 grade of 4.0.

Example IX

For the first-stage solution, a sol-gel composite solution comprised of a mixture of a structural base reagent (tetraethyl orthosilicate), a plasticizer (trimethoxypropylsilane), an bonding agent (3-glicydyloxypropyltrimethoxysilane), and solvents (methanol and water) was prepared under an acidic condition (pH=5, adjusted with HCl) by mixing the aforementioned chemicals. The resulting solution was diluted with methanol. This solution was then used to treat a nylon 6,6-based carpet sample of dimensions 4"×4" by immersing the sample in the solution bath. Excess solution was removed by suspending the saturated sample in the air with the tufts of the carpet oriented orthogonal to the local vertical. Enough solution was drained from the sample to attain a target %-weight pick-up ranging between 150% (wt./wt.)-200% (wt./wt.). The carpet sample was then allowed to air dry/cure prior to the deposition of the second-stage solution. The second-stage solution was prepared by dispersing enough of a hydrophobic chemical reagent (trichloro(octyl)silane) into an aqueous mixture of methanol (MeOH) and isopropanol (i-PrOH) with a molar ratio i-PrOH:MeOH of 0.529 to yield a 2.0% (v./v.) trimethoxy(octyl)silane solution. The second stage solution was allowed to mix under an acidic condition (pH<1). After heated mixing, the solution was neutralized with KOH (may contain up to 15% (wt./wt.) of water) until the pH reached 2. The second-stage solution was allowed to settle prior to filtration to remove excess insoluble salts. The second-stage solution mentioned above was then used to treat the nylon 6,6-based sample previously treated with the first-stage solution by immersing the sample in the second-stage solution bath. Excess solution was removed by suspending the saturated sample in the air with the tufts of the carpet oriented orthogonal to the local vertical. Enough solution was drained from the sample to attain a target %-weight pick-up ranging between 150% (wt./wt.)-200% (wt./wt.). The carpet sample was then allowed to air dry/cure prior to efficacy evaluation. The following test methods were conducted to evaluate the surface energy of the treated sample at the carpet-air interface and stain-resistant properties: AATCC Test Method 193-2012, AATCC Test Method 175-2003 and Ford Laboratory Test Method BN 112-08. Correspondingly, the treated sample received an ALR grade of 3.0, an AATCC Red 40 Stain Scale grade of 2.5, and an AATCC Evaluation Procedure 2/ISO 105-A03 grade of 4.0.

Example X

For the first-stage solution, a sol-gel composite solution comprised of a mixture of a structural base reagent (tetraethyl orthosilicate), a plasticizer (trimethoxypropylsilane), an bonding agent (3-glicydyloxypropyltrimethoxysilane), and solvents (methanol and water) was prepared under an acidic conditions (pH=5, adjusted with HCl) by mixing the aforementioned chemicals. The resulting solution was diluted with methanol. This solution was then used to treat a nylon 6,6-based carpet sample of dimensions 4"×4" by immersing the sample in the solution bath. Excess solution was removed by suspending the saturated sample in the air with the tufts of the carpet oriented orthogonal to the local vertical. Enough solution was drained from the sample to attain a target %-weight pick-up ranging between 150% (wt./wt.)-200% (wt./wt.). The carpet sample was then allowed to air dry/cure prior to the deposition of the second-stage solution. The second-stage solution was prepared by dispersing enough of a hydrophobic chemical reagent (trichlorooctylsilane) into an aqueous mixture of methanol (MeOH) and isopropanol (i-PrOH) with a molar ratio i-PrOH:MeOH of 0.529 to yield a 2.0% (v./v.) trimethoxyoctylsilane solution. The second stage solution was allowed to mix under an acidic condition (pH<1). After heated mixing, the solution was neutralized with KOH (may contain up to 15% (wt./wt.) of water) until the pH reached 3.5. The second-stage solution was allowed to settle prior to filtration to remove excess insoluble salts. The second-stage solution mentioned above was then used to treat the nylon 6,6-based sample previously treated with the first-stage solution by immersing the sample in the second-stage solution bath. Excess solution was removed by suspending the saturated sample in the air with the tufts of the carpet oriented orthogonal to the local vertical. Enough solution was drained from the sample to attain a target %-weight pick-up ranging between 150% (wt./wt.)-200% (wt./wt.). The carpet sample was then allowed to air dry/cure prior to efficacy evaluation. The following test methods were conducted to evaluate the surface energy of the treated sample at the carpet-air interface and stain-resistant properties: AATCC Test Method 193-2012, AATCC Test Method 175-2003 and Ford Laboratory Test Method BN 112-08. Correspondingly, the treated sample received an ALR grade of 3.0, an AATCC Red 40 Stain Scale grade of 2.75, and an AATCC Evaluation Procedure 2/ISO 105-A03 grade of 4.0.

Example XI

For the first-stage solution, a sol-gel composite solution comprised of a mixture of a structural base reagent (tetraethyl orthosilicate), a plasticizer (trimethoxypropylsilane), an bonding agent (3-glicydyloxypropyltrimethoxysilane), and solvents (methanol and water) was prepared under an acidic condition (pH=5, adjusted with HCl) by mixing the aforementioned chemicals. The resulting solution was diluted with methanol. This solution was then used to treat a nylon 6,6-based carpet sample of dimensions 4"×4" by immersing the sample in the solution bath. Excess solution was removed by suspending the saturated sample in the air with the tufts of the carpet oriented orthogonal to the local vertical. Enough solution was drained from the sample to attain a target %-weight pick-up ranging between 150% (wt./wt.)-200% (wt./wt.). The carpet sample was then allowed to air dry/cure prior to the deposition of the second-stage solution. The second-stage solution was prepared by dispersing enough of a hydrophobic chemical reagent (trichlorooctylsilane) into an aqueous mixture of methanol (MeOH) and isopropanol (i-PrOH) with a molar ratio i-PrOH:MeOH of 0.529 to yield a 2.0% (v./v.) trimethoxyoctylsilane solution. The second stage solution was allowed to mix under an acidic condition (pH<1). After heated mixing, the solution was neutralized with KOH (may contain up to 15% (wt./wt.) of water) until the pH reached 5. The second-stage solution was allowed to settle prior to filtration to remove excess insoluble salts. The second-stage solution mentioned above was then used to treat the nylon 6,6-based sample previously treated with the first-stage solution by immersing the sample in the second-stage solution bath. Excess solution was removed by suspending the saturated sample in the air with the tufts of the carpet oriented orthogonal to the local vertical. Enough solution was drained from the sample to attain a target %-weight pick-up ranging between 150% (wt./wt.)-200% (wt./wt.). The carpet sample was then allowed to air dry/cure prior to efficacy evaluation. The following test methods were conducted to evaluate the surface energy of the treated sample at the carpet-air interface and stain-resistant properties: AATCC Test Method 193-2012, AATCC Test Method 175-2003 and Ford Laboratory Test Method BN 112-08. Correspondingly, the treated sample received an ALR grade of 3.0, an AATCC Red 40 Stain Scale grade of 2.5, and an AATCC Evaluation Procedure 2/ISO 105-A03 grade of 4.0.

Example XII

For the first-stage solution, a sol-gel composite solution comprised of a mixture of a structural base reagent (tetraethyl orthosilicate), a plasticizer (trimethoxypropylsilane), an bonding agent (3-glicydyloxypropyltrimethoxysilane), and solvents (methanol and water) was prepared under an acidic condition (pH=5, adjusted with HCl) by mixing the aforementioned chemicals. The resulting solution was diluted with methanol. This solution was then used to treat a nylon 6,6-based carpet sample of dimensions 4"×4" by immersing the sample in the solution bath. Excess solution was removed by suspending the saturated sample in the air with the tufts of the carpet oriented orthogonal to the local vertical. Enough solution was drained from the sample to attain a target %-weight pick-up ranging between 150% (wt./wt.)-200% (wt./wt.). The carpet sample was then allowed to air dry/cure prior to the deposition of the second-stage solution. The second-stage solution was prepared by dispersing enough of a hydrophobic chemical reagent (trichlorooctylsilane) into an aqueous mixture of methanol (MeOH) and isopropanol (i-PrOH) with a molar ratio i-PrOH:MeOH of 0.529 to yield a 2.0% (v./v.) trimethoxyoctylsilane solution. The second stage solution was allowed to mix under an acidic condition (pH<1). After heated mixing, the solution was neutralized with KOH (may contain up to 15% (wt./wt.) of water) until the pH reached 9.5. The second-stage solution was allowed to settle prior to filtration to remove excess insoluble salts. The second-stage solution mentioned above was then used to treat the nylon 6,6-based sample previously treated with the first-stage solution by immersing the sample in the second-stage solution bath. Excess solution was removed by suspending the saturated sample in the air with the tufts of the carpet oriented orthogonal to the local vertical. Enough solution was drained from the sample to attain a target %-weight pick-up ranging between 150% (wt./wt.)-200% (wt./wt.). The carpet sample was then allowed to air dry/cure prior to efficacy evaluation. The following test methods were conducted to evaluate the surface energy of the treated sample at the carpet-air interface and stain-resistant properties: AATCC Test Method 193-2012, AATCC Test Method 175-2003 and Ford Laboratory Test Method BN 112-08. Correspondingly, the treated sample received an ALR grade of 3.0, an AATCC Red 40 Stain Scale grade of 5.75, and an AATCC Evaluation Procedure 2/ISO 105-A03 grade of 4.0.

Example XIII

For the first-stage solution, a sol-gel composite solution comprised of a mixture of a structural base reagent (tetraethyl orthosilicate), a plasticizer (trimethoxypropylsilane), an bonding agent (3-glicydyloxypropyltrimethoxysilane), and solvents (methanol and water) was prepared under an acidic condition (pH=5, adjusted with HCl) by mixing the aforementioned chemicals. The resulting solution was diluted with methanol. This solution was then used to treat a nylon 6,6-based carpet sample of dimensions 4"×4" by immersing the sample in the solution bath. Excess solution was removed by suspending the saturated sample in the air with the tufts of the carpet oriented orthogonal to the local vertical. Enough solution was drained from the sample to attain a target %-weight pick-up ranging between 150% (wt./wt.)-200% (wt./wt.). The carpet sample was then allowed to air dry/cure prior to the deposition of the second-stage solution. The second-stage solution was prepared by dispersing enough of a hydrophobic chemical reagent (dichlorodimethylsilane) into an aqueous mixture of methanol (MeOH) to yield a 3.0% (v./v.) dimethoxydimethylsilane solution. The second-stage solution was allowed to mix under an acidic condition (pH<1). After heated mixing, the solution was neutralized with KOH (may contain up to 15% (wt./wt.) of water) until the pH reached 4. The second-stage solution was allowed to settle prior to filtration to remove excess insoluble salts. The second-stage solution mentioned above was then used treat the nylon 6,6-based sample previously treated with the first-stage solution by immersing the sample in the second-stage solution bath. Excess solution was removed by suspending the saturated sample in the air with the tufts of the carpet oriented orthogonal to the local vertical. Enough solution was drained from the sample to attain a target %-weight pick-up ranging between 150% (wt./wt.)-200% (wt./wt.). The carpet sample was then allowed to air dry/cure prior to efficacy evaluation. The following test methods were conducted to evaluate the surface energy of the treated sample at the carpet-air interface and stain-resistant properties: AATCC Test Method 193-2012, AATCC Test Method 175-2003 and Ford Laboratory Test Method BN 112-08. Correspondingly, the treated sample received an ALR grade of 4.0, an AATCC Red 40 Stain Scale grade of 7.0, and an AATCC Evaluation Procedure 2/ISO 105-A03 grade of 3.0.

Example XIV

For the first-stage solution, a sol-gel composite solution comprised of a mixture of a structural base reagent (tetraethyl orthosilicate), a plasticizer (trimethoxypropylsilane), an bonding agent (3-glicydyloxypropyltrimethoxysilane), and solvents (methanol and water) was prepared under an acidic condition (pH=5, adjusted with HCl) by mixing the aforementioned chemicals. The resulting solution was diluted with methanol. This solution was then used to treat a nylon 6,6-based carpet sample of dimensions 4"×4" by immersing the sample in the solution bath. Excess solution was removed by suspending the saturated sample in the air with the tufts of the carpet oriented orthogonal to the local vertical. Enough solution was drained from the sample to attain a target %-weight pick-up ranging between 150% (wt./wt.)-200% (wt./wt.). The carpet sample was then allowed to air dry/cure prior to the deposition of the second-stage solution. The second-stage solution was prepared by dispersing enough of two hydrophobic chemical reagents (dichlorodimethylsilane and isobutyltriethoxysilane), with a molar ratio isobutyltriethoxysilane:dichlorodimethylsilane of 4, into an aqueous mixture of methanol, yielding a 0.37% (v./v.) dichlorodimethylsilane and 3.00% (v./v.) isobutyltriethoxysilane solution. To assimilate the acidic conditions that would be present if using the chlorinated analog (isobutyltrichlorosilane) of isobutyltriethoxysilane, the pH of the second-stage solution was adjusted with 12 N HCl. The second-stage solution was allowed to mix under an acidic condition (pH<1). After heated mixing, the solution was neutralized with KOH (may contain up to 15% (wt./wt.) of water) until the pH reached 4. The second-stage solution was allowed to settle prior to filtration to remove excess insoluble salts. The second-stage solution mentioned above was then used treat the nylon 6,6-based sample previously treated with the first-stage solution by immersing the sample in the second-stage solution bath. Excess solution was removed by suspending the saturated sample in the air with the tufts of the carpet oriented orthogonal to the local vertical. Enough solution was drained from the sample to attain a target %-weight pick-up ranging between 150% (wt./wt.)-200% (wt./wt.). The carpet sample was then allowed to air dry/cure prior to efficacy evaluation. The following test methods were conducted to evaluate the surface energy of the treated sample at the carpet-air interface and stain-resistant properties: AATCC Test Method 193-2012, AATCC Test Method 175-2003 and Ford Laboratory Test Method BN 112-08. Correspondingly, the treated sample received an ALR grade of 3.0, an AATCC Red 40 Stain Scale grade of 5.25, and an AATCC Evaluation Procedure 2/ISO 105-A03 grade of 4.5.

Example XV

For the first-stage solution, a sol-gel composite solution comprised of a mixture of a structural base reagent (tetraethyl orthosilicate), a plasticizer (trimethoxypropylsilane), an bonding agent (3-glicydyloxypropyltrimethoxysilane), and solvents (methanol and water) was prepared under an acidic condition (pH=5, adjusted with HCl) by mixing the aforementioned chemicals. The resulting solution was diluted with methanol. This solution was then used to treat a nylon 6,6-based carpet sample of dimensions 4"×4" by immersing the sample in the solution bath. Excess solution was removed by suspending the saturated sample in the air with the tufts of the carpet oriented orthogonal to the local vertical. Enough solution was drained from the sample to attain a target %-weight pick-up ranging between 150% (wt./wt.)-200% (wt./wt.). The carpet sample was then allowed to air dry/cure prior to the deposition of the second-stage solution. The second-stage solution was prepared by dispersing enough of two hydrophobic chemical reagents (dichlorodimethylsilane and isobutyltriethoxysilane), with a molar ratio isobutyltriethoxysilane:dichlorodimethylsilane of 1.33, into an aqueous mixture of methanol, yielding a 1.12% (v./v.) dichlorodimethylsilane and 3.00% (v./v.) isobutyltriethoxysilane solution. To assimilate the acidic conditions that would be present if using the chlorinated analog (isobutyltrichlorosilane) of isobutyltriethoxysilane, the pH of the second-stage solution was adjusted with 12 N HCl. The second-stage solution was allowed to mix under an acidic condition (pH<1). After heated mixing, the solution was neutralized with KOH (may contain up to 15% (wt./wt.) of water) until the pH reached 4. The second-stage solution was allowed to settle prior to filtration to remove excess insoluble salts. The second-stage solution mentioned above was then used treat the nylon 6,6-based sample previously treated with the first-stage solution by immersing the sample in the second-stage solution bath. Excess solution was removed by suspending the saturated sample in the air with the tufts of the carpet oriented orthogonal to the local vertical. Enough solution was drained from the sample to attain a target %-weight pick-up ranging between 150% (wt./wt.)-200% (wt./wt.). The carpet sample was then allowed to air dry/cure prior to efficacy evaluation. The following test methods were conducted to evaluate the surface energy of the treated sample at the carpet-air interface and stain-resistant properties: AATCC Test Method 193-2012, AATCC Test Method 175-2003 and Ford Laboratory Test Method BN 112-08. Correspondingly, the treated sample received an ALR grade of 4.0, an AATCC Red 40 Stain Scale grade of 6.75, and an AATCC Evaluation Procedure 2/ISO 105-A03 grade of 4.5.

Example XVI

For the first-stage solution, a sol-gel composite solution comprised of a mixture of a structural base reagent (tetraethyl orthosilicate), a plasticizer (trimethoxypropylsilane), an bonding agent (3-glicydyloxypropyltrimethoxysilane), and solvents (methanol and water) was prepared under an acidic condition (pH=5, adjusted with HCl) by mixing the aforementioned chemicals. The resulting solution was diluted with methanol. This solution was then used to treat a nylon 6,6-based carpet sample of dimensions 4"×4" by immersing the sample in the solution bath. Excess solution was removed by suspending the saturated sample in the air with the tufts of the carpet oriented orthogonal to the local vertical. Enough solution was drained from the sample to attain a target %-weight pick-up ranging between 150% (wt./wt.)-200% (wt./wt.). The carpet sample was then allowed to air dry/cure prior to the deposition of the second-stage solution. The second-stage solution was prepared by dispersing enough of a hydrophobic chemical reagent (isobutyltriethoxysilane) into an aqueous mixture of methanol (MeOH) to yield a 3.00% (v./v.) isobutyltriethoxysilane solution. To assimilate the protic conditions that would be present if using the chlorinated analog (isobutyltrichlorosilane) of isobutyltriethoxysilane, the pH of the second-stage solution was adjusted with 12 N HCl. The second-stage solution was allowed to mix under an acidic condition (pH<1). After heated mixing, the solution was neutralized with KOH (may contain up to 15% (wt./wt.) of water) until the pH reached 4. The second-stage solution was allowed to settle prior to filtration to remove excess insoluble salts. The second-stage solution mentioned above was then used treat the nylon 6,6-based sample previously treated with the first-stage solution by immersing the sample in the second-stage solution bath. Excess solution was removed by suspending the saturated sample in the air with the tufts of the carpet oriented orthogonal to the local vertical. Enough solution was drained from the sample to attain a target %-weight pick-up ranging between 150% (wt./wt.)-200% (wt./wt.). The carpet sample was then allowed to air dry/cure prior to efficacy evaluation. The following test methods were conducted to evaluate the surface energy of the treated sample at the carpet-air interface and stain-resistant properties: AATCC Test Method 193-2012, AATCC Test Method 175-2003 and Ford Laboratory Test Method BN 112-08. Correspondingly, the treated sample received an ALR grade of 3.0, an AATCC Red 40 Stain Scale grade of 2.75, and an AATCC Evaluation Procedure 2/ISO 105-A03 grade of 4.5.

Example XVII

For the first-stage solution, a sol-gel composite solution comprised of a mixture of a structural base reagent (tetraethyl orthosilicate), a plasticizer (trimethoxypropylsilane), an bonding agent (3-glicydyloxypropyltrimethoxysilane), and solvents (methanol and water) was prepared under an acidic condition (pH=5, adjusted with HCl) by mixing the aforementioned chemicals. The resulting solution was diluted with methanol. This solution was then used to treat a nylon 6,6-based carpet sample of dimensions 4"×4" by immersing the sample in the solution bath. Excess solution was removed by suspending the saturated sample in the air with the tufts of the carpet oriented orthogonal to the local vertical. Enough solution was drained from the sample to attain a target %-weight pick-up ranging between 150% (wt./wt.)-200% (wt./wt.). The carpet sample was then allowed to air dry/cure prior to the deposition of the second-stage solution. The second-stage solution was prepared by dispersing enough of two hydrophobic reagents (dichlorodimethylsilane and trichlorooctylsilane), with a molar ratio trichlorooctylsilane:dichlorodimethylsilane of 4, into an aqueous mixture of methanol, yielding a 0.26% (v./v.) dichlorodimethylsilane and 2.00% (v./v.) trichlorooctylsilane solution. The second-stage solution was allowed to mix under an acidic condition (pH<1). After heated mixing, the solution was neutralized with KOH (may contain up to 15% (wt./wt.) of water) until the pH reached 5. The second-stage solution was allowed to settle prior to filtration to remove excess insoluble salts. The second-stage solution mentioned above was then used treat the nylon 6,6-based sample previously treated with the first-stage solution by immersing the sample in the second-stage solution bath. Excess solution was removed by suspending the saturated sample in the air with the tufts of the carpet oriented orthogonal to the local vertical. Enough solution was drained from the sample to attain a target %-weight pick-up ranging between 150% (wt./wt.)-200% (wt./wt.). The carpet sample was then allowed to air dry/cure prior to efficacy evaluation. The following test methods were conducted to evaluate the surface energy of the treated sample at the carpet-air interface and stain-resistant properties: AATCC Test Method 193-2012, AATCC Test Method 175-2003 and Ford Laboratory Test Method BN 112-08. Correspondingly, the treated sample received an ALR grade of 4.0, an AATCC Red 40 Stain Scale grade of 6.50, and an AATCC Evaluation Procedure 2/ISO 105-A03 grade of 3.25.

Example XVIII

For the first-stage solution, a sol-gel composite solution comprised of a mixture of a structural base reagent (tetraethyl orthosilicate), a plasticizer (trimethoxypropylsilane), an bonding agent (3-glicydyloxypropyltrimethoxysilane), and solvents (methanol and water) was prepared under an acidic condition (pH=5, adjusted with HCl) by mixing the aforementioned chemicals. The resulting solution was diluted with methanol. This solution was then used to treat a nylon 6,6-based carpet sample of dimensions 4"×4" by immersing the sample in the solution bath. Excess solution was removed by suspending the saturated sample in the air with the tufts of the carpet oriented orthogonal to the local vertical. Enough solution was drained from the sample to attain a target %-weight pick-up ranging between 150% (wt./wt.)-200% (wt./wt.). The carpet sample was then allowed to air dry/cure prior to the deposition of the second-stage solution. The second-stage solution was prepared by dispersing enough of two hydrophobic reagents (dichlorodimethylsilane and trichloro(octyl)silane), with a molar ratio trichloro(octyl)silane:dichlorodimethylsilane of 1.33, into an aqueous mixture of methanol, yielding a 0.76% (v./v.) dichlorodimethylsilane and 2.00% (v./v.) trichlorooctylsilane solution. The second-stage solution was allowed to mix under an acidic condition (pH<1). After heated mixing, the solution was neutralized with KOH (may contain up to 15% (wt./wt.) of water) until the pH reached 5. The second-stage solution was allowed to settle prior to filtration to remove excess insoluble salts. The second-stage solution mentioned above was then used treat the nylon 6,6-based sample previously treated with the first-stage solution by immersing the sample in the second-stage solution bath. Excess solution was removed by suspending the saturated sample in the air with the tufts of the carpet oriented orthogonal to the local vertical. Enough solution was drained from the sample to attain a target %-weight pick-up ranging between 150% (wt./wt.)-200% (wt./wt.). The carpet sample was then allowed to air dry/cure prior to efficacy evaluation. The following test methods were conducted to evaluate the surface energy of the treated sample at the carpet-air interface and stain-resistant properties: AATCC Test Method 193-2012, AATCC Test Method 175-2003 and Ford Laboratory Test Method BN 112-08. Correspondingly, the treated sample received an ALR grade of 4.0, an AATCC Red 40 Stain Scale grade of 7.0, and an AATCC Evaluation Procedure 2/ISO 105-A03 grade of 4.0.

Example XIX

For the first-stage solution, a sol-gel solution comprised of a mixture of a structural base reagent (tetraethyl orthosilicate), a plasticizer (trimethoxypropylsilane), a bonding reagent (3-glicydyloxypropyltrimethoxysilane), and solvents (methanol and water) was prepared under an acidic condition (pH=5, adjusted with HCl) by mixing the aforementioned chemicals. The resulting solution was diluted with methanol. This solution was then used to treat a nylon 6,6-based carpet sample of dimensions 4"×4" by immersing the sample in the sol-gel solution bath. Excess solution was removed by suspending the saturated sample in the air with the tufts of the carpet oriented orthogonal to the local vertical. Enough solution was drained from the sample to attain a target %-weight pick-up ranging between 150% (wt./wt.)-200% (wt./wt.). The carpet sample was then allowed to air dry/cure prior to the deposition of the second-stage solution. The second-stage solution was prepared by dispersing enough of two hydrophobic chemical reagents (dichlorodimethylsilane and trichlorophenylsilane), with a molar ratio dichlorodimethylsilane:trichlorophenylsilane of 4, into an aqueous mixture of methanol, yielding a 2.00% (v./v.) dimethoxydimethylsilane and 0.664% (v./v.) trimethoxyphenylsilane solution. The second-stage solution was allowed to mix under an acidic condition (pH<1). After heated mixing, the solution was neutralized with KOH (may contain up to 15% (wt./wt.) of water) until the pH reached 5.5. The second-stage solution was allowed to settle prior to filtration to remove excess insoluble salts. The second-stage solution mentioned above was then used treat the nylon 6,6-based sample previously treated with the first-stage solution by immersing the sample in the second-stage solution bath. Excess solution was removed by suspending the saturated sample in the air with the tufts of the carpet oriented orthogonal to the local vertical. Enough solution was drained from the sample to attain a target %-weight pick-up ranging between 150% (wt./wt.)-200% (wt./wt.). The carpet sample was then allowed to air dry/cure prior to efficacy evaluation. The following test methods were conducted to evaluate the surface energy of the treated sample at the carpet-air interface and stain-resistant properties: AATCC Test Method 193-2012 and AATCC Test Method 175-2003. Correspondingly, the treated sample received an ALR grade of 3.0 and an AATCC Red 40 Stain Scale grade of 7.0.

Example XX

For the first-stage solution, a sol-gel solution comprised of a mixture of a structural base reagent (tetraethyl orthosilicate), a plasticizer (trimethoxypropylsilane), a bonding reagent (3-glicydyloxypropyltrimethoxysilane), and solvents (methanol and water) was prepared under an acidic condition (pH=5, adjusted with HCl) by mixing the aforementioned chemicals. The resulting solution was diluted with methanol. This solution was then used to treat a nylon 6,6-based carpet sample of dimensions 4"×4" by immersing the sample in the sol-gel solution bath. Excess solution was removed by suspending the saturated sample in the air with the tufts of the carpet oriented orthogonal to the local vertical. Enough solution was drained from the sample to attain a target %-weight pick-up ranging between 150% (wt./wt.)-200% (wt./wt.). The carpet sample was then allowed to air dry/cure prior to the deposition of the second-stage solution. The second-stage solution was prepared by dispersing enough hydrophobic chemical reagent (trichlorophenylsilane) yielding a 3.00% (v./v.) trimethoxyphenylsilane solution. The second-stage solution was allowed to mix under an acidic condition (pH<1). After heated mixing, the solution was neutralized with KOH (may contain up to 15% (wt./wt.) of water) until the pH reached 5.5. The second-stage solution was allowed to settle prior to filtration to remove excess insoluble salts. The second-stage solution mentioned above was then used treat the nylon 6,6-based sample previously treated with the first-stage solution by immersing the sample in the second-stage solution bath. Excess solution was removed by suspending the saturated sample in the air with the tufts of the carpet oriented orthogonal to the local vertical. Enough solution was drained from the sample to attain a target %-weight pick-up ranging between 150% (wt./wt.)-200% (wt./wt.). The carpet sample was then allowed to air dry/cure prior to efficacy evaluation. The following test methods were conducted to evaluate the surface energy of the treated sample at the carpet-air interface and stain-resistant properties: AATCC Test Method 193-2012 and AATCC Test Method 175-2003. Correspondingly, the treated sample received an ALR grade of 3.0 and an AATCC Red 40 Stain Scale grade of 6.0.

Example XXI

The following describes the solution preparation and coating procedure for composite coated textile materials exhibiting high physical strength. A sol-gel solution comprised a mixture of base chemical reagent (tetraethyl orthosilicate), plasticizer (trimethoxypropylsilane), bonding agent (3-glycidoxypropyltrimethoxysilane) and solvents (water and methanol) in acidic environment (pH=5, adjusted with HCl) was prepared by mixing the above chemicals. The resulting solution was used to treat a geotextile polyester woven fabric (approximately 12"×12") by immersing the fabric into the solution. The excess solution was drained from the fabric until the pick-up is between 50 and 100%. The fabric was dried until fully cured. The resulting textile exhibiting high physical strength which can stand much higher load of impact or puncture comparing to the original untreated textile.

Example XXII

The following describes the solution preparation and coating procedure for composite coated textile materials exhibiting high physical strength and UV-resistance. A sol-gel solution comprised a mixture of base chemical reagent (tetraethyl orthosilicate), plasticizer (trimethoxypropylsilane), bonding agent (3-glycidoxypropyltrimethoxysilane) and solvents (water and methanol) in acidic environment (pH=5, adjusted with HCl) was prepared by mixing the above chemicals. Titanium Oxide powder (size ~325 mesh) was added into the solution and stirred until fully mixed. The resulting solution was used to treat a geotextile polyester woven fabric (approximately 12"×12") by immersing the fabric into the solution. The excess solution was drained from the fabric until the pick-up is between 50 and 100%. The fabric was dried until fully cured. The resulting textile exhibiting high physical strength which can stand much higher load of impact or puncture and UV-resistance comparing to the original untreated textile.

Embodiments described herein are included to demonstrate particular aspects of the present disclosure. It should be appreciated by those of skill in the art that the embodiments described herein merely represent exemplary embodiments of the disclosure. Those of ordinary skill in the art should, in light of the present disclosure, appreciate that many changes can be made in the specific embodiments described and still obtain a like or similar result without departing from the spirit and scope of the present disclosure. From the foregoing description, one of ordinary skill in the art can easily ascertain the essential characteristics of this disclosure, and without departing from the spirit and scope thereof, can make various changes and modifications to adapt the disclosure to various usages and conditions. The embodiments described hereinabove are meant to be illustrative only and should not be taken as limiting of the scope of the disclosure.

What is claimed is:

1. A method for treating a substrate for improved soil-resistance or stain-resistance, the method comprising:
    selecting a substrate to be coated;
    preparing a composite solution that is fluorine-free, wherein the composite solution consists of water, acid, first solvent, base chemical reagent, plasticizer and bonding agent, the composite solution comprises 3-8 vol. % of the water, 20-30 vol. % of the first solvent, 40-60 vol. % of the base chemical reagent, 15-20 vol. % of the plasticizer, and 5-10 vol. % of the bonding agent,
        wherein further the base chemical reagent is selected from an alkoxysilane, metal oxide precursor, or a combination thereof having a general formula of $M(OR)_4$, where M=Si, Al, Ti, In, Sn or Zr, and R comprises hydrogen, a substituted or unsubstituted alkyl,
        the bonding agent is selected from an alkoxysilane, metal oxide precursor, or a combination thereof having a general formula of $M(OR)_x R'_y R''_z$ (M=Si, Al, In, Sn or Ti; x is the integer 1, 2 or 3; y is the integer 0, 1 or 2; z is the integer 1, 2 or 3, provided that the sum of x, y and z equals 4), where R comprises hydrogen, a substituted or unsubstituted alkyl or derivatives thereof; R' comprises hydrogen, a substituted or unsubstituted alkyl or derivatives thereof and R'' comprises a substituted or unsubstituted epoxy or glicidoxy, and
        the plasticizer is selected from an alkoxysilane, metal oxide precursor, or a combination thereof having a general formula of $M(OR)_{4-x}R'_x$ (M=Si, Al, In, Sn or Ti; x is the integer 1, 2 or 3), where R comprise hydrogen, a substituted or unsubstituted alkyl or derivatives thereof and R' comprise a substituted or unsubstituted alkyl, a substituted or unsubstituted alkenyl, a substituted or unsubstituted alkynyl, a substituted or unsubstituted aryl or derivatives thereof;
    utilizing the composite solution to coat the substrate to form a superhydrophobic coating, wherein the composite solution is deposited via an all solution process, and a degree of polymerization of the composite solution is equal to or less than 100;
    coating the substrate with a hydrophobic solution that is fluorine-free, wherein the hydrophobic solution comprises a hydrophobic chemical agent and a third solvent; and
    drying or curing the substrate at equal to or between 25-200° C. to allow a fluorine-free composite coating to form for improving soil-resistance or stain resistance.

2. The method of claim 1, wherein the composite solution is prepared under acidic condition where pH is equal to or less than 5.

3. The method of claim 2, wherein the preparation step further comprises stirring the composite solution at an elevated temperature in a range of 50-100° C.

4. The method of claim 3, wherein the stirring at the elevated temperature is performed for ½ hour to 12 hours.

5. The method of claim 1, wherein the composition coating formed on the substrate does not change the feel and texture of the substrate before coating.

6. The method of claim 1, wherein the first solvent is selected from water, methanol, ethanol, n-propanol, isopropanol, n-butanol, isobutanol, ethylene glycol, glycerol acetone, acetonitrile, dioxane, tetrahydrofuran, dimethylformamide, dimethyl sulfoxide or a mixture thereof.

7. The method of claim 1, wherein the hydrophobic chemical agent is an alkylsilane $[CH_3(CH_2)_a]_b SiR_c X_d$; where X comprise Cl, Br, I or other suitable organic leaving groups, R comprise a substituted or unsubstituted alkyl, a substituted or unsubstituted alkenyl, a substituted or unsubstituted alkynyl, a substituted or unsubstituted aryl or derivatives thereof, and a is the integer 0, 1, 2, 3 . . . to 20, b is the integer 1, 2 or 3, c is the integer 0, 1, 2, 3 and d is the integer 1, 2 or 3, provided that the sum of b, c and d equals 4.

8. The method of claim 7, wherein the alkylsilane is selected from chlorosilane, dichlorosilane, trichlorosilane, chlorotrimethylsilane, dichlorodimethylsilane, trichloromethylsilane, chlorophenylsilane, dichlorophenylsilane, trichlorophenylsilane, chloromethylphenylsilane, chlorodimethylphenylsilane, dichloromethylphenylsilane, chlorodimethylphenethylsilane, dichloromethylphenethylsilane, trichlorophenethylsilane, chlorodimethyloctylsilane, dichloromethyloctylsilane trichlorooctylsilane, chlorodimethyldodecylsilane, dichloromethyldodecylsilane, trichlorododecylsilane, chlorodecyldimethylsilane, dichlorodecylmethylsilane, trichlorodecylsilane, chlorodimethyloctadecylsilane, dichloromethyloctadecylsilane, trichlorooctadecylsilane, chlorodimethylthexylsilane, dichloromethylthexylsilane, trichlorothexylsilane, allyldichloromethylsilane, allylchlorodimethylsilane, allyltrichlorosilane, (cyclohexylmethyl)chlorodimethylsilane, (cyclohexylmethyl)dichloromethylsilane, or (cyclohexylmethyl)trichlorosilane.

9. The method of claim 1, wherein the third solvent is selected from toluene, benzene, xylene, trichloroethylene, 1,2-dichloroethane, dichloromethane, chloroform, carbon tetrachloride, tetrachloroethylene, n-propyl bromide, diethyl ether, acetone, diisopropyl ether, methyl-t-butyl ether, petroleum ethers or petroleum hydrocarbons.

10. The method of claim 1, wherein the hydrophobic chemical agent is an alkoxyalkylsilane $[CH_3(CH_2)_a]_b SiR_c [alkoxy]_d$; where [alkoxy] comprise methoxy, ethoxy, propoxy, isopropoxy, butoxy, isobutoxy, or a combination thereof; R comprise a substituted or unsubstituted alkyl, a substituted or unsubstituted alkenyl, a substituted or unsubstituted alkynyl, a substituted or unsubstituted aryl or derivatives thereof, and a is the integer 0, 1, 2, 3 . . . to 20, b is the integer 1, 2 or 3, c is the integer 0, 1, 2, 3 and d is the integer 1, 2 or 3, provided that the sum of b, c and d equals 4.

11. The method of claim 10, wherein the alkoxyalkylsilane is selected from trimethoxyisobutylsilane, triethoxyisobutylsilane, dimethoxydiisobutylsilane, diethoxydiisobutylsilane, trimethoxyphenylsilane, triethoxyphenylsilane, dimethoxydiphenylsilane, diethoxydiphenylsilane, dimethoxymethylphenylsilane, diethoxymethylphenylsilane, methoxydimethylphenylsilane, ethoxydimethylphenylsilane, trimethoxy(hexyl)silane, triethoxy(hexyl)silane, tripropoxy(hexyl)silane, triisopropoxy(hexyl)silane, trimethoxy(octyl)silane, triethoxy(octyl)silane, tripropoxy(octyl)silane, triisopropoxy(octyl)silane, trimethoxy(decyl)silane, triethoxy(decyl)silane, tripropoxy(decyl)silane, triisopropoxy(decyl)silane, trimethoxy(dodecyl)silane, triethoxy(dodecyl)silane, tripropoxy(dodecyl)silane, or triisopropoxy(dodecyl)silane.

12. The method of claim 10, wherein the hydrophobic chemical agent is prepared by mixing and heating the hydrophobic agent and the third solvent.

13. The method of claim 12, wherein the mixing and heating the hydrophobic agent and the third solvent occurs in an acidic environment with pH equal to or less than 1.

14. The method of claim 12, wherein the mixing and heating the hydrophobic agent and the third solvent occurs at an elevated temperature equal to or between 50 to 100° C.

15. The method of claim 13, wherein the mixing and heating the hydrophobic agent and the third solvent occurs for equal to or between 1 hour to 7 days.

16. The method of claim 1, wherein the third solvent is selected from methanol, ethanol, n-propanol, isopropanol, n-butanol, isobutanol, acetone, acetonitrile, dioxane, tetrahydrofuran, tetrachloroethylene, dimethylformamide, dimethyl sulfoxide, or water.

\* \* \* \* \*